(12) United States Patent
Arnz et al.

(10) Patent No.: US 9,229,209 B2
(45) Date of Patent: Jan. 5, 2016

(54) AUTOFOCUS DEVICE AND AUTOFOCUSING METHOD FOR AN IMAGING DEVICE

(75) Inventors: Michael Arnz, Oberkochen (DE); Mikhail Levtonov, Landshut (DE); Gerd Klose, Tokyo (JP); Volkmar Betz, Jena (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 46 days.

(21) Appl. No.: 12/863,824

(22) PCT Filed: Jan. 20, 2009

(86) PCT No.: PCT/EP2009/000313
§ 371 (c)(1),
(2), (4) Date: Feb. 14, 2011

(87) PCT Pub. No.: WO2009/092555
PCT Pub. Date: Jul. 30, 2009

(65) Prior Publication Data
US 2011/0134308 A1    Jun. 9, 2011

Related U.S. Application Data

(60) Provisional application No. 61/022,433, filed on Jan. 21, 2008, provisional application No. 61/022,434, filed on Jan. 21, 2008.

(30) Foreign Application Priority Data

Jan. 21, 2008 (DE) .......................... 10 2008 005 355
Jan. 21, 2008 (DE) .......................... 10 2008 005 356

(51) Int. Cl.
H04N 5/232      (2006.01)
G02B 21/24      (2006.01)

(52) U.S. Cl.
CPC ............ *G02B 21/244* (2013.01); *G02B 21/245* (2013.01)

(58) Field of Classification Search
USPC .................. 348/345, 333.08, 208.11, 333.05, 348/333.11, 341; 359/279
See application file for complete search history.

(56) References Cited

U.S. PATENT DOCUMENTS 5,239,170 A      8/1993  Hughlett
5,361,122 A *   11/1994 Kataoka et al. .................. 355/53
(Continued)

FOREIGN PATENT DOCUMENTS

DE      195 37 376      4/1996      .............. G02B 7/36
DE      197 21 112      11/1997     .............. G02B 7/28
(Continued)

OTHER PUBLICATIONS

International Search Report for International Application No. PCT/EP2009/000313 dated Apr. 7, 2009.
(Continued)

*Primary Examiner* — James Hannett
*Assistant Examiner* — Stephen Coleman
(74) *Attorney, Agent, or Firm* — Fish & Richardson P.C.

(57) ABSTRACT

An autofocus device for an imaging device is provided, which has an imaging optic having a first focal plane and an object table for moving an object to be imaged relative to the first focal plane, wherein said autofocus device comprises a) an image recording module having a second focal plane, the location thereof relative to the first focal plane being known, b) a lighting module (BM) for imaging a focusing image along a lighting beam path in a focusing image plane such that, if the object is positioned in a target position at a predetermined distance to the second focal plane, the lighting beam path is folded because of reflection on the object and the focusing image, which lies in the focusing image plane, intersects the second focal plane or lies therein, and c) a control module, which activates the object table to focus the imaging device so that the object is positioned in the target position, from a signal of the image recording module, which the image recording module generates on the basis of the recording thereof of the focusing image when the object is positioned in the target position, derives the deviation of the object position from the target position, and, based on the derived deviation, the predetermined distance, and the relative location of the first and second focal planes, activates the object table so that the object is positioned in the first focal plane.

76 Claims, 17 Drawing Sheets

(56) References Cited

U.S. PATENT DOCUMENTS

| | | |
|---|---|---|
| 5,604,344 A | 2/1997 | Finarov |
| 5,991,004 A | 11/1999 | Wallace et al. |
| 5,995,143 A | 11/1999 | Price et al. |
| 6,075,558 A | 6/2000 | Tachibana et al. |
| 6,825,454 B2 | 11/2004 | Czarnetzki et al. |
| 7,488,924 B2 | 2/2009 | Bublitz et al. |
| 2004/0021936 A1 | 2/2004 | Czarnetzki et al. |
| 2010/0033811 A1 | 2/2010 | Westphal et al. |

FOREIGN PATENT DOCUMENTS

| | | | | |
|---|---|---|---|---|
| DE | 101 12 639 | | 9/2002 | G02B 21/00 |
| DE | 101 27 284 | | 12/2002 | G02B 7/09 |
| DE | 101 53 113 | | 3/2003 | G01C 3/32 |
| DE | 698 07 512 | | 4/2003 | G02B 21/24 |
| DE | 103 04 105 | | 8/2004 | G02B 21/24 |
| DE | 103 19 182 | | 12/2004 | G02B 21/24 |
| DE | 10304105 | * | 5/2006 | G02B 21/24 |
| DE | 10 2006 027 836 | | 12/2007 | G02B 21/24 |
| DE | 10 2007 017 598 | | 10/2008 | G02B 21/06 |
| WO | WO2008/125204 | | 10/2008 | |

OTHER PUBLICATIONS

German Search Report, German Application No. 10 2008 005 356.2, 4 pages, Dec. 19, 2008.

International Preliminary Report on Patentability, International Application No. PCT/EP2009/000313, 12 pages, Jul. 27, 2010.

* cited by examiner

AUTOFOCUS DEVICE AND AUTOFOCUSING METHOD FOR AN IMAGING DEVICE

This application is the National Stage of International Application No. PCT/EP2009/000313, filed Jan. 20, 2009, which claims priority to German Applications No. 10 2008 005 356.2, filed Jan. 21, 2008, 10 2008 005 355.4, filed Jan. 21, 2008 and U. S. Provisional Patent Application Ser. No. 61/022,433, filed on Jan. 21, 2008 and 61/022,434, filed on Jan. 21, 2008. The contents of the above applications are incorporated by reference in their entireties.

The present invention is directed to an autofocus device and an autofocusing method for an imaging device.

Such an autofocus device is known, for example, from DE 103 19 182 and DE 10 2006 027 836 A1. In these autofocus devices, an intensity-modulated grating image is projected obliquely onto the sample to be focused and is captured via a camera. The laterally varying contrast in the captured image is analyzed to determine the defocus in the capture direction.

With such autofocus devices, however, the difficulty arises that structures of the object often cause unwanted modulation of the intensity of the projected grating image. Due to these unforeseeable intensity variations, the accuracy of determination of the defocus is limited, and so, therefore, is the focusing precision of the autofocus device.

Proceeding herefrom, it is an object of the invention to make available a high-precision autofocus device for an imaging device. A corresponding autofocusing method is also to be provided.

The object is achieved by means of an autofocus device for an imaging device, comprising an imaging optic having a first focal plane and further comprising an object table for moving a to-be-imaged object relative to said first focal plane, wherein said autofocus device includes an image capture module having a second focal plane whose position relative to said first focal plane is known, an illumination module for projecting a focusing image along an illuminating beam path into a focusing image plane in such a way that when the object is positioned in a target position at a predetermined distance from the second focal plane, the illuminating beam path is folded by reflection from the object, and the focusing image, lying in the focusing image plane, intersects the second focal plane or lies therein; and a control module, which, to focus the imaging device, actuates the object table so that the object is positioned in the target position; derives the deviation of the object position from the target position from a signal of the image capture module which the image capture module generates on the basis of its captured image of the focusing image when the object is positioned in the target position; and, based on the derived deviation, the predetermined distance and the relative positions of the first and second focal planes, actuates the object table so that the object is positioned in the first focal plane.

With this autofocus device, therefore, the effect is advantageously achieved that the object itself is disposed at a distance from the second focal plane and is therefore blurry to the image capture module. The focusing image, however, intersects the second focal plane or lies therein, so consequently at least the region of the focusing image that is in the second focal plane is detected much more sharply by the image capture module than is the object itself. This substantially reduces the influence of structures of the object on the image captured by the image capture module, making it possible to determine the deviation of the position of the object from the target position with extreme precision. Based on this deviation, and taking into account the predetermined distance and the relative positions of the first and second focal planes, the object can then be positioned in the first focal plane.

In the autofocus device, the first and second focal planes can coincide. This is particularly the case if the imaging optic of the imaging device is used as the image capture module. This has the additional advantage that no separate image capture module need be provided. The imaging optic that is already present can be used for the autofocusing.

The focusing image is, in particular, an intensity-modulated image, in which case the image capture module preferably outputs the captured image of the focusing image as a signal. The control module can analyze the captured image with respect to intensity modulations or contrast variations.

The focusing image is, in particular, periodically intensity-modulated in a first direction. Thus, it can, for example, comprise alternating light and dark strips.

The first direction of the focusing image lying in the focusing image plane is preferably not parallel to the intersection lines of the focusing image and the second focal plane. In particular, the first direction is perpendicular to the intersection lines.

The focusing image can comprise a plurality of subimages that are periodically intensity-modulated in a first direction and have the same period, said subimages being mutually phase-shifted. In particular, the subimages can be disposed side by side perpendicularly to the first direction.

In this case, the control module can calculate, for each subimage, a subimage deviation from which the deviation is then derived. In particular, an arithmetic mean calculation can be performed.

The image capture module can particularly comprise a two-dimensional image sensor, such as, for example, a CCD or CMOS sensor, to capture as a two-dimensional image the focusing image intersecting the second focal plane.

The illumination module preferably comprises an illumination source emitting incoherent or partially coherent illuminating radiation, together with a transmission grating. The transmission grating preferably has a transmission behavior that varies periodically in a first direction. The illumination module images the illuminated transmission grating, as a focusing image, into the second focal plane.

The image capture module can detect the focusing image for example confocally in the second focal plane. In this case, the focusing image can, for example, be confocal point illumination or line illumination of the kind known in connection with confocal microscopes.

The autofocus device according to the invention can be a component of the imaging device. The imaging device can in particular be configured as a microscope. Preferably, it is a microscope of the kind used to inspect lithography masks and/or wafers for the semiconductor industry.

The grating can, of course, be configured not only as a transmissive grating, but also as a reflective grating. In particular, it is possible to generate the grating by means of a spatial light modulator, such as, for example, a tilting mirror matrix. The grating not only can be passive (i.e., illuminated), but can also be configured as an active grating. Self-illuminating light modulators, for example, such as OLED modulators, can be used for this purpose.

Also provided is an autofocusing method for an imaging device comprising an imaging optic having a first focal plane, wherein according to said autofocusing method, an image capture module is provided that has a second focal plane whose position relative to said first focal plane is known, the object is positioned in a target position that is a predetermined distance from the second focal plane, a focusing image is projected along an illuminating beam path into a focusing image plane in such a way that the illuminating beam path is folded by reflection from the object positioned in the target position, and the focusing image, lying in the focusing image plane, intersects the second focal plane or lies therein, the image capture module captures the focusing image lying in the focusing image plane, the deviation of the object position from the target position is derived from the captured image, and, based on the derived deviation, the predetermined distance and the relative positions of the first and second focal planes, the object is positioned in the first focal plane.

This autofocusing method furnishes the advantage that the focusing image is captured sharply, while the object is simultaneously blurry. Structures of the object that interfere with defocus determination can be effectively suppressed in this way.

Refinements of the autofocusing method according to the invention are specified in the dependent method claims.

It is understood that the features cited above and elaborated on below can be used not only in the stated combinations, but also in other combinations or individually, without departing from the scope of the present invention.

The present invention is further directed to an autofocus device and an autofocusing method for an imaging device.

Such an autofocus device is known, for example, from DE 103 19 182 and from DE 10 2006 027 836 A1. In these autofocus devices, an intensity-modulated grating image is projected obliquely onto the sample to be focused and is captured via a camera. The laterally varying contrast in the captured image is analyzed to determine the defocus in the capture direction.

It has been found, however, that the focusing precision of the known methods is inadequate precisely for applications in the field of lithography-mask and/or wafer inspection in semiconductor fabrication.

Proceeding herefrom, it is a further object of the invention to make available a higher-precision autofocus device for an imaging device. A corresponding autofocusing method is also to be provided.

The object is achieved by means of an autofocus device for an imaging device, comprising an imaging optic having a first focal plane and further comprising an object table for moving a to-be-imaged object relative to said first focal plane, wherein said autofocus device includes an image capture module having a second focal plane whose position relative to said first focal plane is known; an illumination module for projecting a focusing image containing a plurality of subimages that are periodically intensity-modulated in a first direction and have the same period, said subimages being mutually phase-shifted, along an illuminating beam path over the object into a focusing image plane, such that when the object is positioned in a target position, the focusing image, lying in the focusing image plane, intersects the second focal plane; and a control module, which, to focus the imaging device, actuates the object table so that the object is positioned in the target position; derives the deviation of the object position from the target position from a signal of the image capture module which the image capture module generates on the basis of its captured image of the focusing image when the object is positioned in the target position; and, based on the derived deviation, the target position and the relative positions of the first and second focal planes, actuates the object table so that the object is positioned in the first focal plane.

Since the focusing image contains the mutually phase-shifted subimages, the influence of the phasing of the individual subimages of the focusing image in the focusing image plane can be taken into account in deriving the deviation of the object position from the target position. The deviation of the object position from the target position can be determined with higher precision in this way.

In the autofocus device, the first and second focal planes can coincide. This is particularly the case when the image capture module is used as the imaging optic of the imaging device. This has the additional advantage that it is unnecessary to provide a separate image capture module. The imaging optic that is already present can be used for the autofocusing.

The focusing image is, in particular, an intensity-modulated image, in which case the image capture module preferably outputs the captured image of the focusing image as a signal.

The control module can then analyze the captured image with respect to intensity modulations or contrast variations.

In particular, the subimages of the focusing image can be disposed side by side perpendicularly to the first direction.

The control module can calculate, for each subimage, a subimage deviation from which the deviation is then derived. In particular, the arithmetic mean of the subimage deviations can be calculated.

The first direction of the focusing image lying in the focusing image plane is preferably not parallel to the intersection lines of the focusing image and the second focal plane. In particular, the first direction p is perpendicular to the intersection lines.

The image capture module can particularly comprise a two-dimensional image sensor, such as, for example, a CCD or CMOS sensor, to capture as a two-dimensional image the focusing image intersecting the second focal plane.

The illumination module preferably comprises an illumination source emitting incoherent or partially coherent illuminating radiation, together with a transmission grating. The transmission grating preferably has a transmission behavior that varies periodically in a first direction. The illumination module images the illuminated transmission grating, as a focusing image, into the second focal plane.

The autofocus device according to the invention can be a component of the imaging device. The imaging device can in particular be configured as a microscope. Preferably, it is a microscope of the kind used to inspect lithography masks and/or wafers for the semiconductor industry.

The grating can, of course, be configured not only as a transmissive grating, but also as a reflective grating. In particular, it is possible to generate the grating by means of a spatial light modulator, such as, for example, a tilting mirror matrix. The grating not only can be passive (i.e., illuminated), but can also be configured as an active grating. Self-illuminating light modulators, for example, such as OLED modulators, can be used for this purpose.

In the autofocus device, the illumination of the object can be effected in transmission. Incident-light illumination is also, of course, possible. In particular, the illuminating beam path can be folded by reflection from the object.

Furthermore, in the case of beam path folding by reflection from the object, the target position can be a predetermined distance from the second focal plane.

This advantageously achieves the effect that the object itself is at a distance from the second focal plane and is therefore blurry to the image capture module. The focusing image, however, intersects the second focal plane, so at least the region of the focusing image that is in the second focal plane is detected much more sharply by the image capture module than is the object itself. This substantially reduces the influence of structures of the object on the image captured by the image capture module, making it possible to determine the deviation of the position of the object from the target position with extreme precision. Based on this deviation, and taking into account the predetermined distance and the relative positions of the first and second focal planes, the object can then be positioned in the first focal plane.

Also provided is an autofocusing method for an imaging device comprising an imaging optic having a first focal plane, wherein according to said autofocusing method for an imaging device comprising an imaging optic having a first focal plane, an image capture module is provided that has a second focal plane whose position relative to said first focal plane is known; the object is positioned in a target position; a focusing image containing a plurality of subimages that are periodically intensity-modulated in a first direction and have one period, said subimages being mutually phase-shifted, is projected along an illuminating beam path over the object into a focusing image plane in such a way that the focusing image lying in the focusing image plane intersects the second focal plane; the image capture module captures the focusing image lying in the focusing image plane; the deviation of the object position from the target position is derived from the captured image; and, based on the derived deviation, the predetermined distance and the relative positions of the first and second focal planes, the object is positioned in the first focal plane.

Since the focusing image contains the plurality of mutually phase-shifted subimages, the interference effect of the phasing of the individual subimages in the focusing image plane can be taken into account in the analysis, thus making it possible to increase the focusing precision.

Refinements of the autofocusing method according to the invention are specified in the dependent method claims.

It is understood that the features cited above and elaborated on below can be used not only in the stated combinations, but also in other combinations or individually, without departing from the scope of the present invention.

The invention will be described exemplarily in yet more detail below with reference to the annexed drawings, which also disclose features essential to the invention. Therein:

Figure 1:
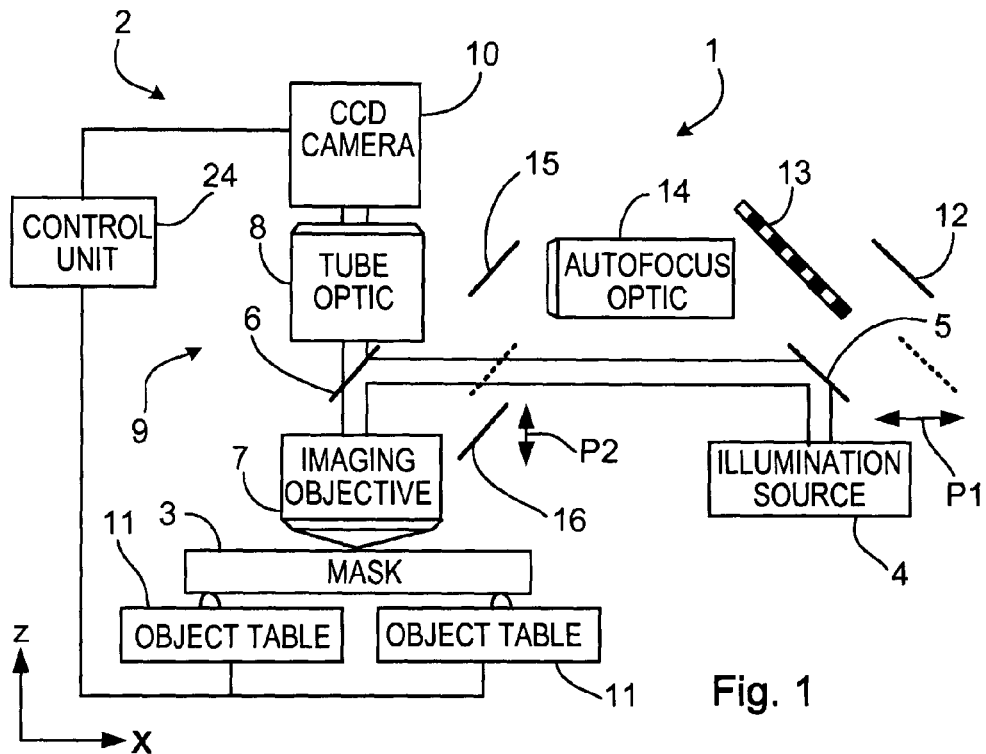
FIG. 1 shows a first embodiment of the autofocus device according to the invention.
Figure 2:
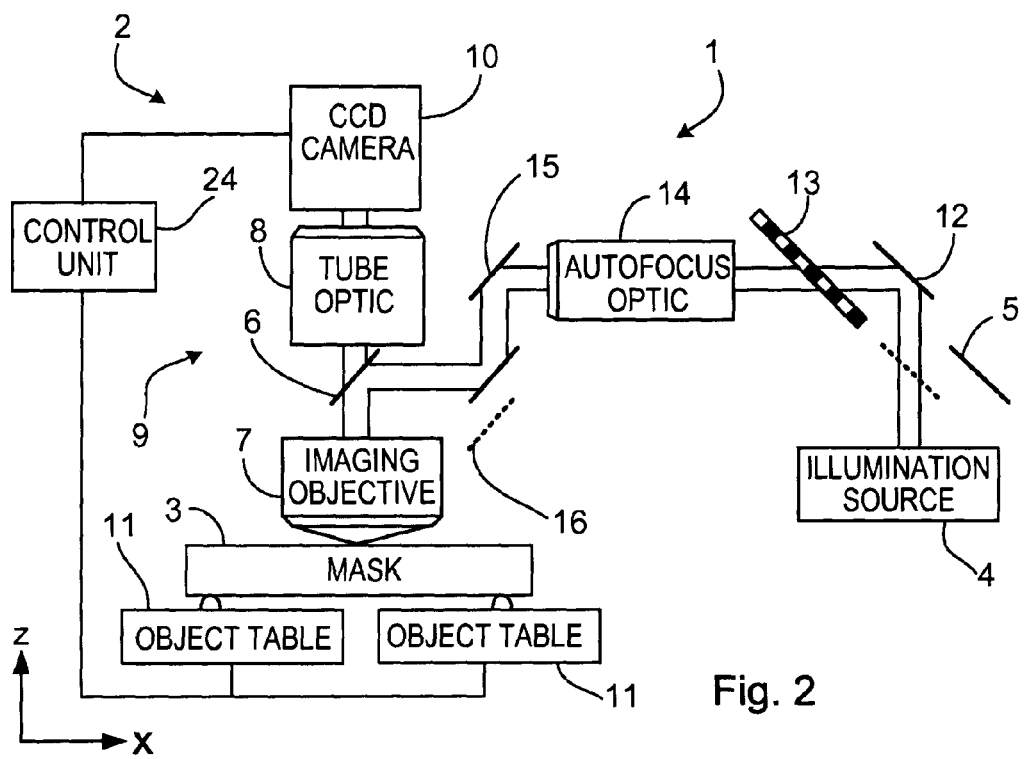
FIG. 2 is another depiction of the first embodiment of the autofocus device according to the invention.
Figure 14:
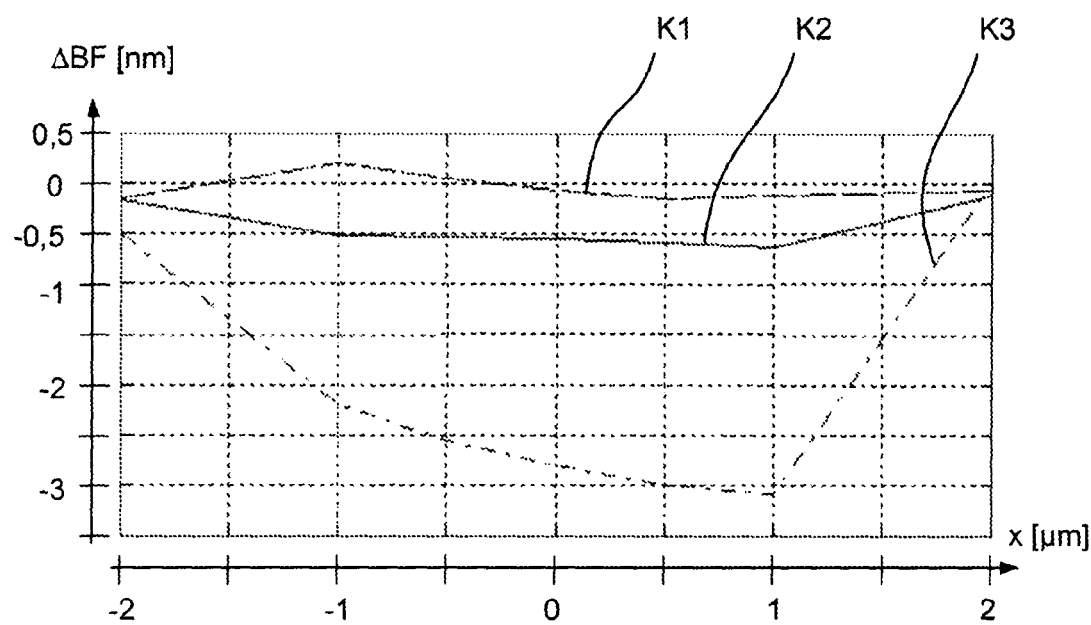
FIG. 14 is a graph illustrating the dependence of the calculated defocus $\Delta BF$ on the position of the edge at which the reflection behavior of the object changes discontinuously, on the object for different grating periods g.
Figure 16:
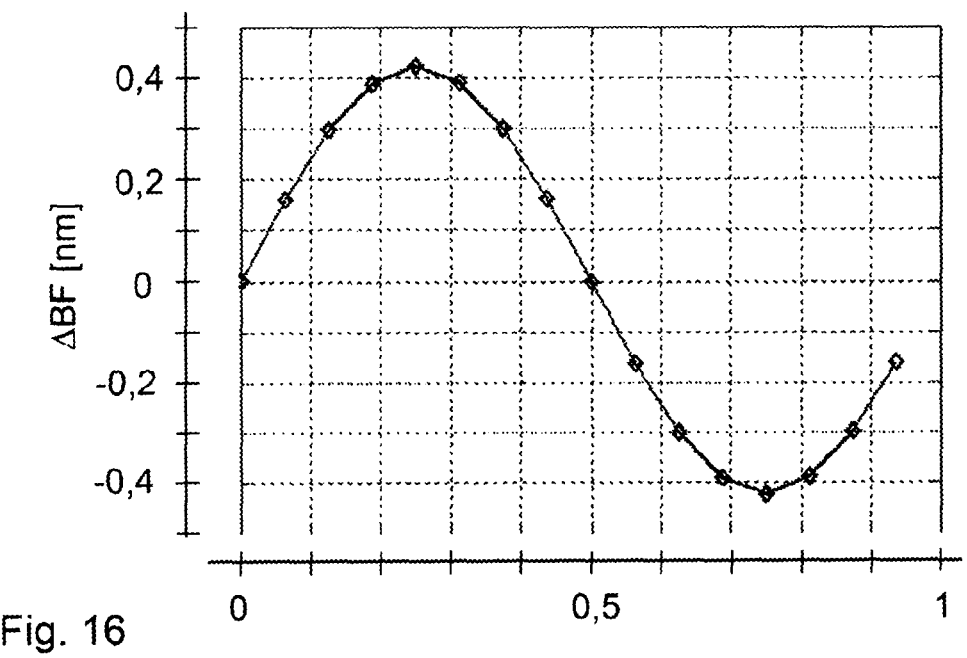
FIG. 16 is a graph illustrating the dependence of the calculated defocus $\Delta BF$ on the initial phase for a grating period g of 1000 nm.
Figure 40:
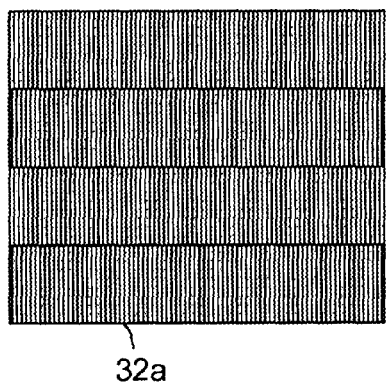
Figure 41:
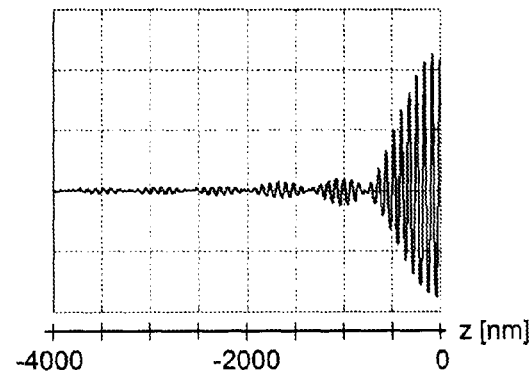
Figure 42:
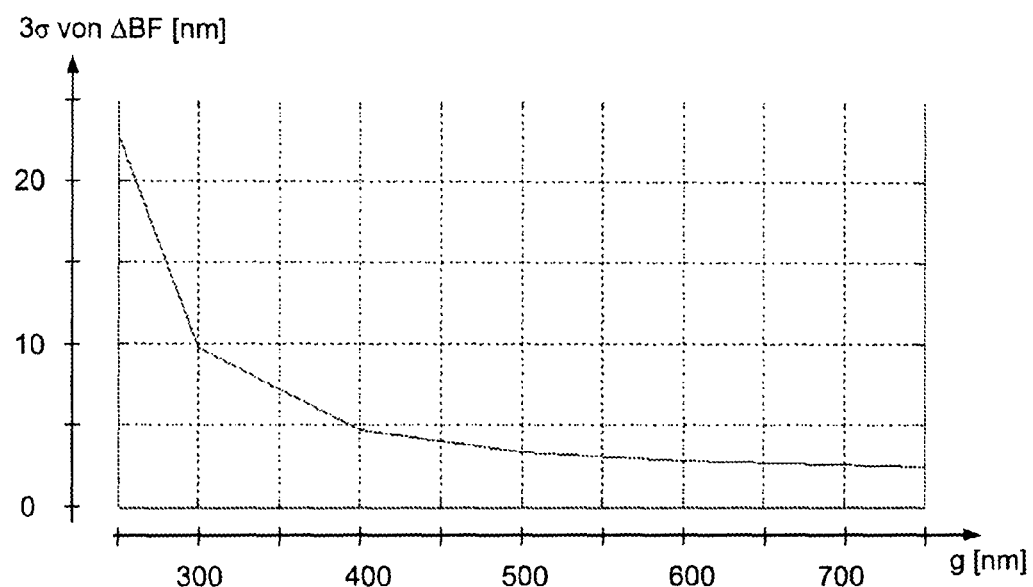
Figure 43:
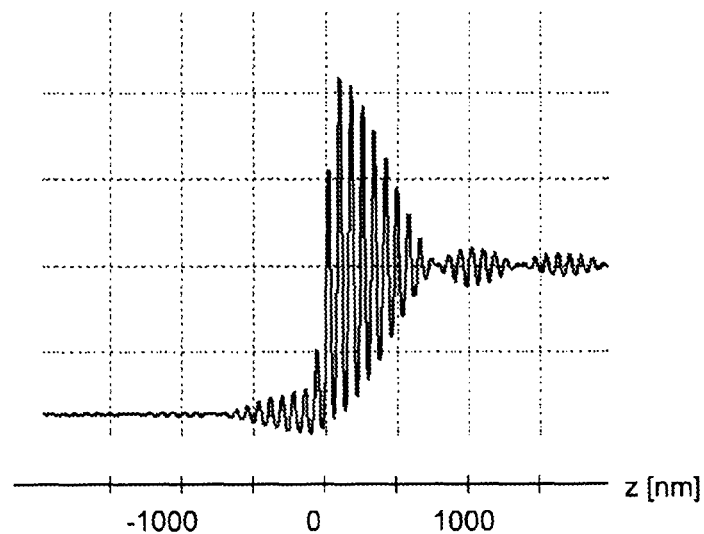
Figure 44:
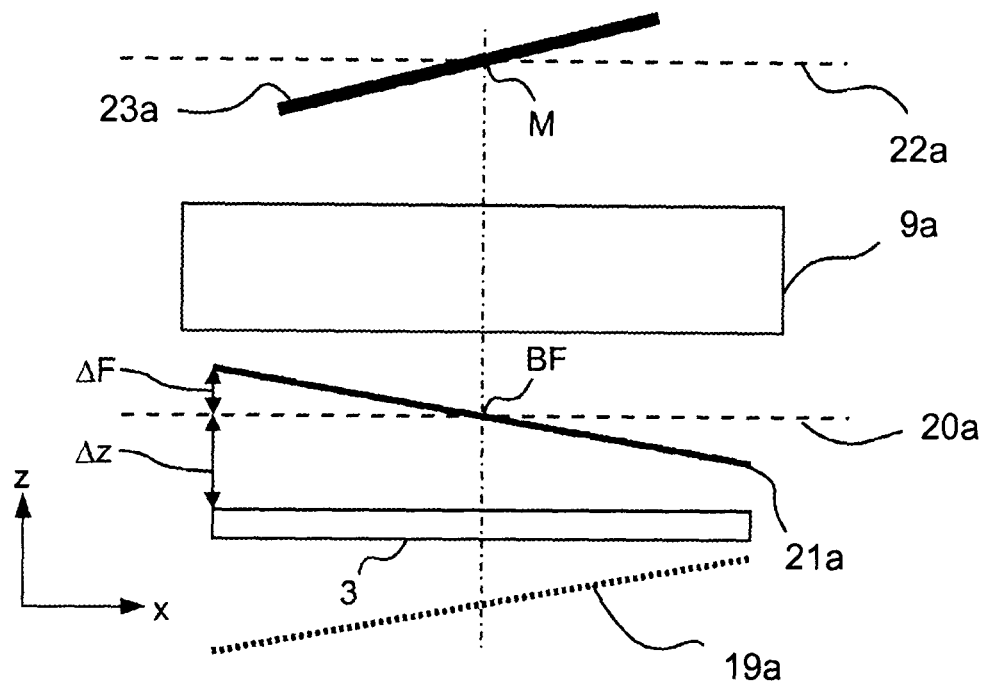
Figure 45:
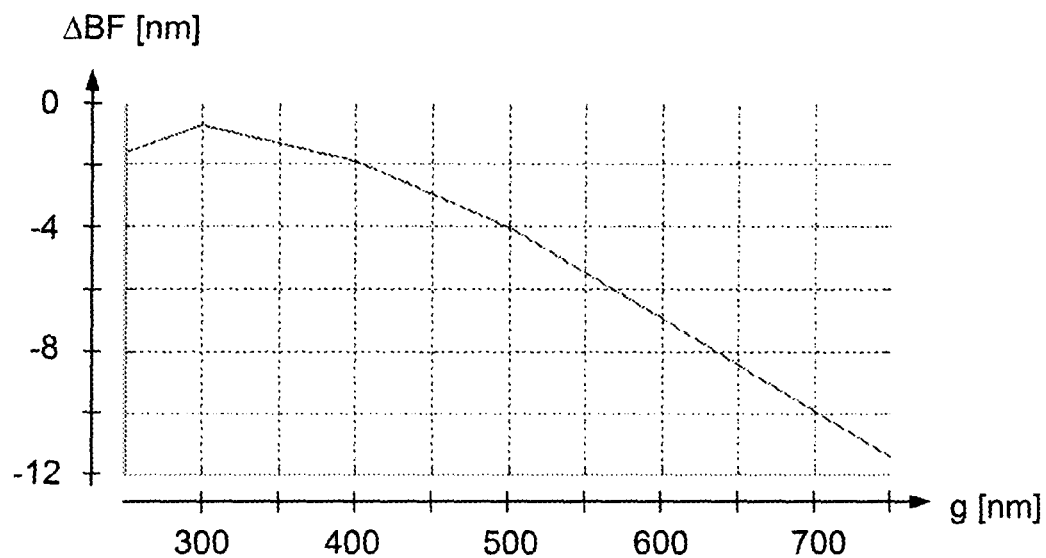
Figure 46:
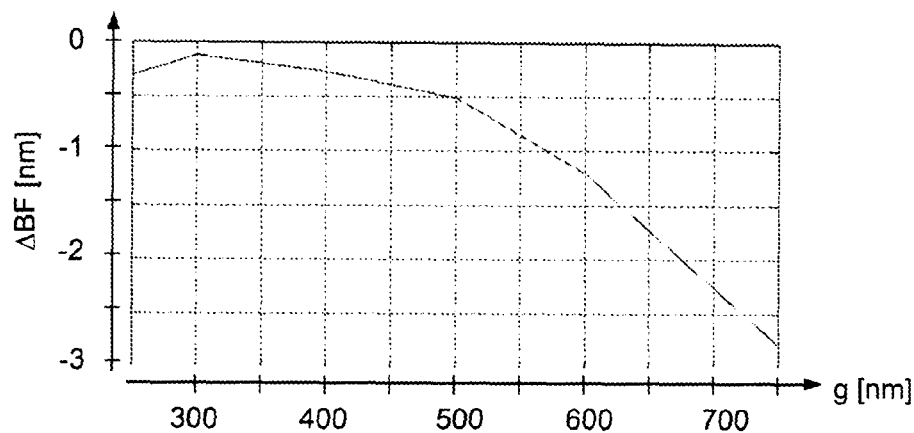
Figure 47:
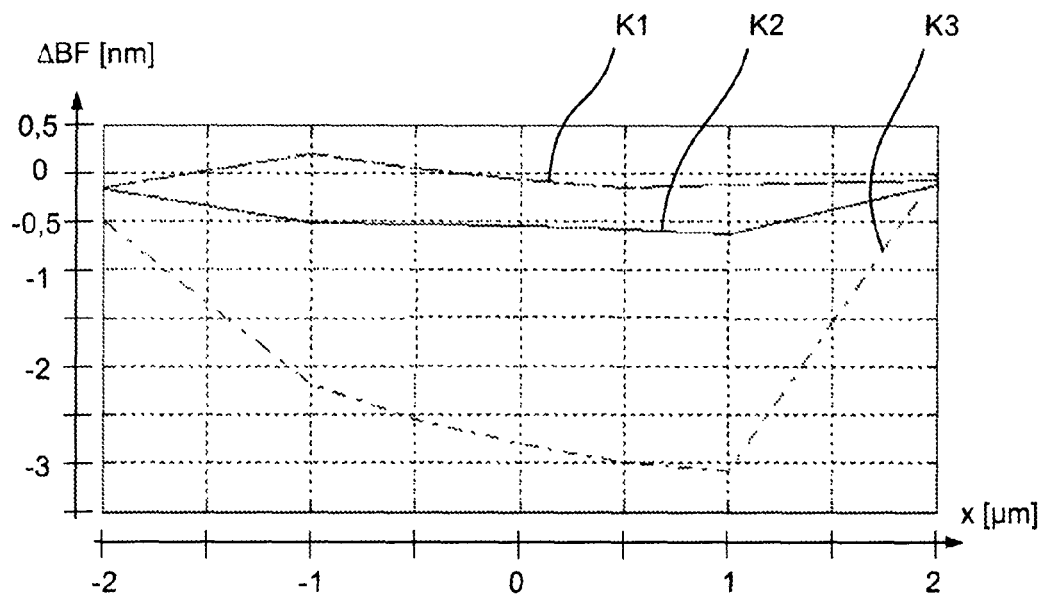

FIG. 40 shows another grating 32 with four subgratings having the same period and different initial phases, the grating period of grating 32 being only half that of grating 31 from FIG. 14;

FIG. 41 shows the contrast behavior for one of the subgratings of FIG. 16, assuming the best focus location to lie at the boundary of the defocus measurement range;

FIG. 42 is a representation of the threefold standard deviation σ of the defocus ΔBF as a function of the grating period for an assumed CCD noise level of 2%, and FIG. 43 is a schematic representation of the influence of a discontinuously changing reflection behavior of the object on the intensity variation of the captured reflected focusing image;

FIG. 44 is a representation illustrating the shifted arrangement of the object 3 relative to the focal plane 20 for determining the defocus;

FIG. 45 is a representation of the determined defocus ΔBF as a function of the grating period g of the focusing image 19 on the object 3 for an object shift Δz of 2 μm;

FIG. 46 is a representation of the determined defocus ΔBF as a function of the grating period g of the focusing image 19 on the object 3 for an object shift Δz of 4 μm; and FIG. 47 is a graph illustrating the dependence of the calculated defocus ΔBF on the position of the edge at which the reflection behavior of the object changes discontinuously, on the object for different grating periods;

In the embodiment illustrated in FIGS. 1 and 2, the autofocus device 1 is integrated into a microscope 2 for inspecting lithography masks 3.

The microscope 2 includes an illumination source 4 emitting incoherent or partially coherent illuminating radiation with a wavelength of 193 nm. The illuminating radiation is guided via a first deflection mirror 5 and a second deflection mirror 6 to the imaging objective 7 and is aimed by the latter at the lithography mask (object) 3 to effect the illumination (FIG. 1).

The object 3 is projected, via the imaging objective 7, the partially transparent deflection mirror 6 and a tube optic 8, which together form an imaging optic 9, to a CCD camera 10 to produce an image of a portion of the object. For example, the microscope 2 can be used for high-precision determination of the lateral positions of alignment marks on the lithography mask 3.

The microscope 2 further comprises an object table 11, by means of which the object 3 can be positioned both laterally and in the observation direction (i.e., the z-direction).

The autofocus device 1 uses the illumination source 4 and the imaging objective 7 of the microscope 2 to illuminate the object 3 with a focusing image, and uses the imaging objective 7, the tube optic 8 and the CCD camera 9 to capture the focusing image.

For this purpose, on the one hand, the first deflection mirror 5 is displaceable (indicated by double arrow P1) in such a way that it can be moved out of the beam path of the illuminating radiation 5 coming from the illumination source 4, as illustrated in FIG. 2. The illuminating radiation thus encounters a third deflection mirror 12, which directs the illuminating radiation through a grating 13 that is tilted 45° with respect to the propagation direction of the illuminating radiation. The tilt angle can also, however, be any other angle within the range of 1-89°. The grating structure is projected onto the object 3 via an autofocus optic 14, two additional deflection mirrors 15, 16, the second deflection mirror 6 and the imaging objective 7. Deflection mirror 16 is provided to be translatable (double arrow P2) such that it can be translated from the position shown in FIG. 1 to the position shown in FIG. 2, to make it possible to project the focusing image onto the object 3.

Figure 3:
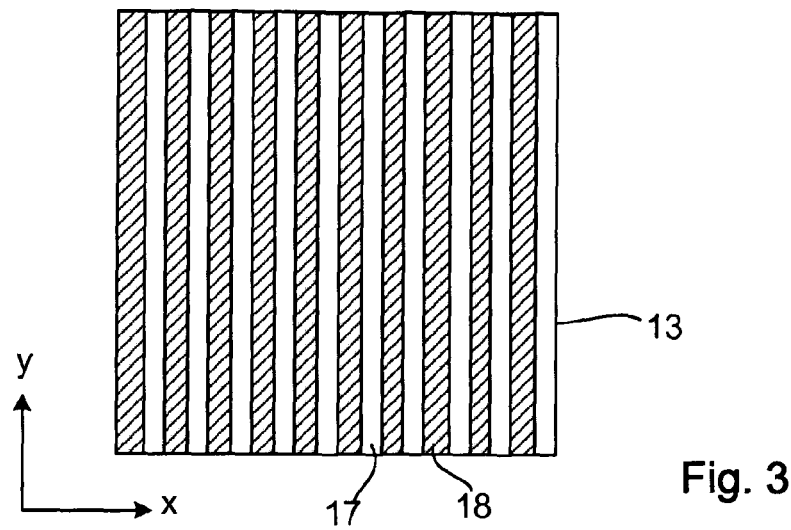
FIG. 3 is a plan view of the transmission grating 13 of FIGS. 1 and 2.

The grating 13 can, for example—as illustrated in FIG. 3—be configured as a ruled grating alternatingly comprising transparent strips 17 and non-transparent strips 18 (depicted as shaded). The grating extends periodically in the x-direction.

To explain the present invention, the principle of determining the focal position with the aid of a captured image of the grating 13 projected obliquely onto the object 3 will first be described with reference to FIGS. 4 to 9.

Figure 4:
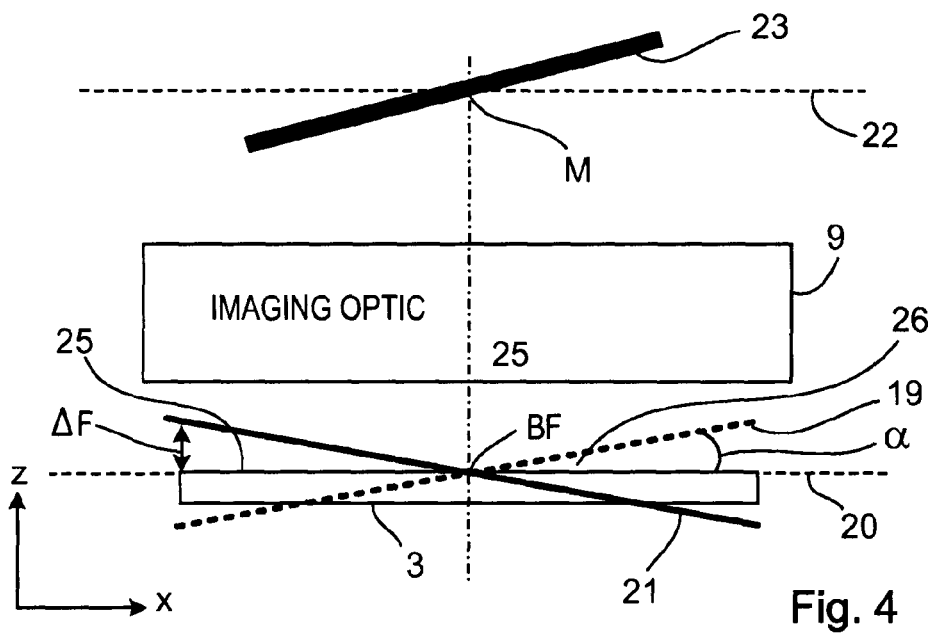
FIG. 4 is a schematic representation illustrating defocus determination based on a projected image of the tilted grating 13.

A result of the tilt of the grating 13 and the size-reducing imaging of the grating 13 by means of the autofocus optic 14 and the imaging objective 7 with a numerical aperture of 0.6, the angle α which the focusing image plane in which the focusing image 19 lies forms with the focal plane 20 of the imaging optic 9 of the microscope 2 is approximately 9°. In the representation of FIG. 4, it is assumed that the object 3 or its top side is positioned exactly in the focal plane 20. The grating 13 imaged onto the object 3, and thus the focusing image 19, are reflected by the object 3, as indicated by solid line 21, and are projected as aerial image 23 by imaging optic 9 into the detector plane 22 of the two-dimensional CCD sensor (not shown) of the CCD camera 10.

Figure 5:
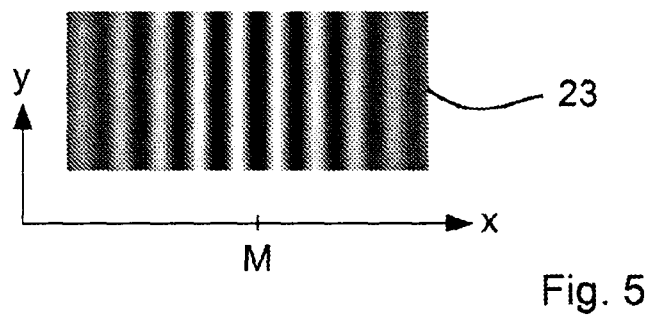
FIG. 5 is a schematic representation of the aerial image captured by the detector of the CCD camera 10.

When the focus is optimal (i.e., when the object 3 is positioned in focal plane 20), the CCD detector sees the (aerial) image indicated in FIG. 5. Once the focusing image 19 of FIG. 4 intersects focal plane 20 at the center (viewed in the x-direction), the reflected focusing image 21 also intersects focal plane 20 at the center, as a result of which the best focus (BF) location of the reflected focusing image 21 lies at the center and the aerial image 23 of the reflected focusing image 21 at the CCD detector is sharpest at the center M and decreases outwardly in both directions. The same is true of the contrast in the aerial image 23.

Due to the chosen tilt of the grating and the size reduction that takes place during the projection of the grating, the distance ΔF of the edge of the reflected focusing image 21 from the focal plane 20 here is 2 μm, so the capture range or defocus measurement range is ΔF/2, i.e., 1 μm.

Figure 6:
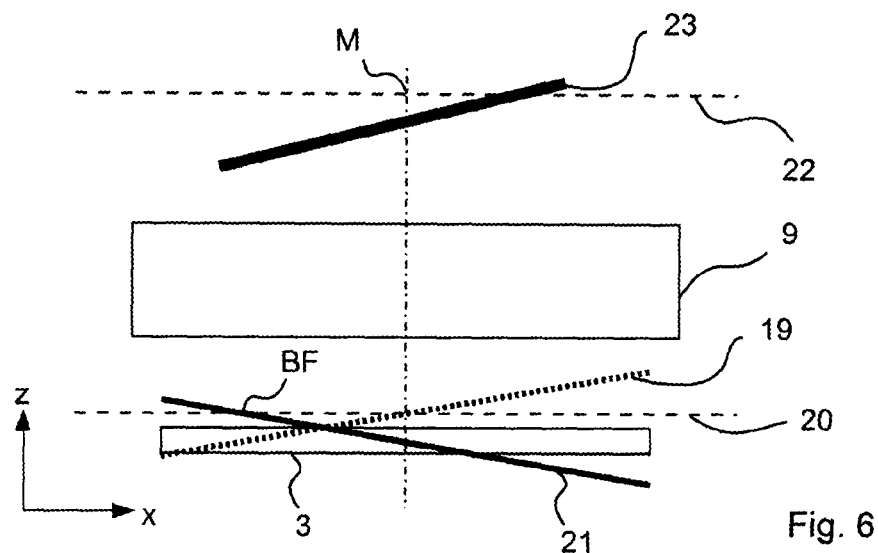
FIG. 6 is a schematic representation illustrating the shift of the reflected focusing image in the presence of a defocus of the object.
Figure 7:
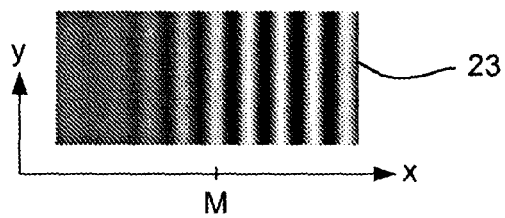
FIG. 7 is a schematic representation of the image, captured by the CCD detector of the camera 10, of the aerial image of the reflected focusing image 21 from FIG. 6.

If, for example, the object 3 is slightly defocused because it is positioned slightly below the focal plane 20, as depicted in FIG. 6, this causes a displacement of the best focus (BF) location of the reflected aerial image 21. The location of sharpest imaging is therefore also displaced in the aerial image 23 at the CCD detector, as indicated, for example, in FIG. 7. Defocusing of the object 3 (i.e., a deviation in the z-direction) causes a lateral displacement (in the x-direction) of the location of sharpest imaging in the aerial image 23.

Figure 8:
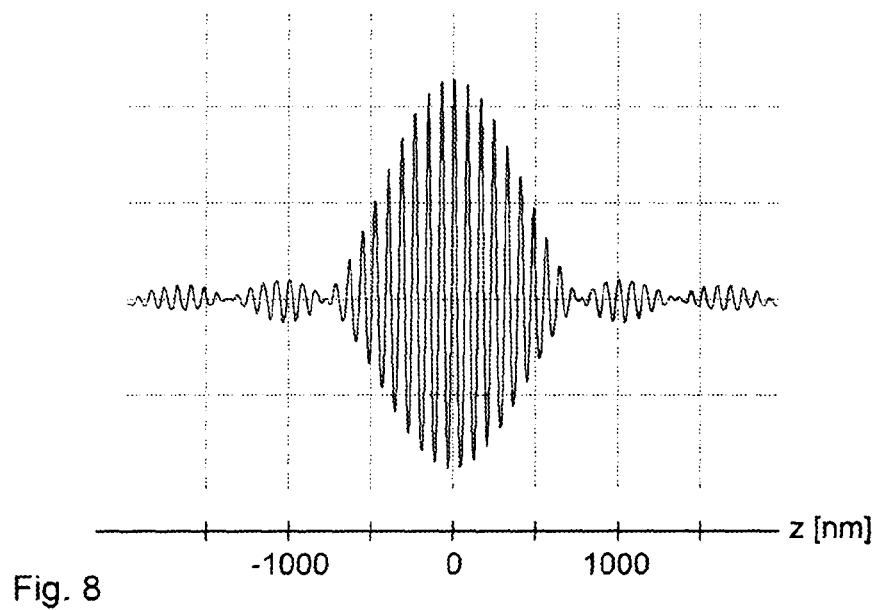
FIG. 8 is a representation of the intensity profile of the captured image from FIG. 5.

The aerial image 23 captured by the CCD camera is routed to a control unit 24 (FIGS. 1, 2) of the autofocus device 1. The control unit 24 can, for example, calculate the mean in the y-direction (FIGS. 5, 7) for each x-value of the aerial image to derive an intensity profile that is dependent only on the x-coordinate. Once the tilt angle of the grating 13, the size reduction factor associated with the illumination of the object 3 and the magnification factor associated with the capture of the grating image 23 are known, the determined intensity can be plotted as a function of the distance z from the focal plane 20, as illustrated in FIG. 8. FIG. 8 is a plot of the intensity of the aerial image 23 from FIG. 5, i.e., the object 3 is optimally focused. Thus, the intensity maximum occurs at z=0 nm (best focus location), so the calculated defocus ΔBF is also equal to 0 nm. The defocus ΔBF here represents the deviation of the top side of the object 3 from the focal plane 20 in nm.

Figure 9:
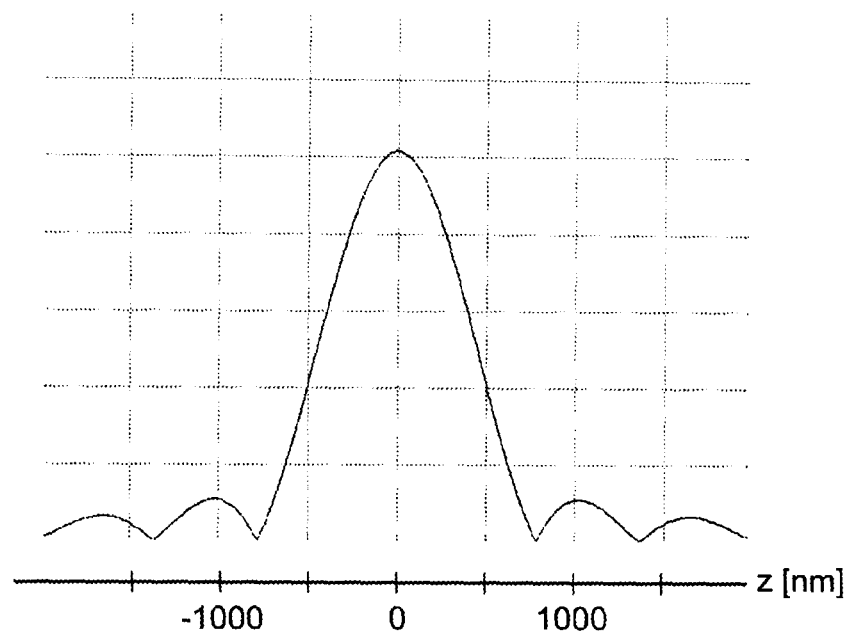
FIG. 9 is a representation of the contrast profile derived from the intensity profile of FIG. 8.

The contrast profile illustrated in FIG. 9 can be derived from the intensity profile by means of a folding operation. The position of the contrast maximum corresponds to the defocus, which is zero here, since the contrast maximum occurs at z=0 nm.

It has been found, however, that fabricated structures present on the object 3 often cause unwanted intensity modulation of the captured aerial image 23 in the lateral direction (the x-direction). If, for example, a structure of the object is positioned such that the reflectivity of the left-hand region 25 (FIG. 4) is, for example, about 4% and the reflectivity of the right-hand region 26 is, for example, about 30%, the aerial image 23 will have the intensity profile illustrated in FIG. 10. The actual defocus can no longer be extrapolated from this intensity profile with the desired precision. The systematic errors (up to 20 nm) that occur under these circumstances have been found to exceed the desired precision of measurement.

Figure 11:
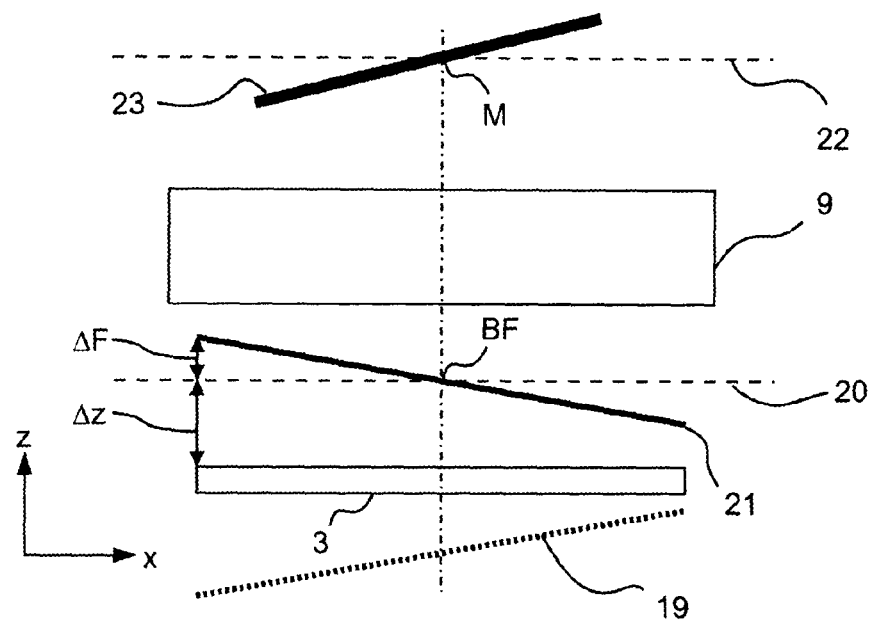
FIG. 11 is a representation illustrating the inventive shifted arrangement of the object 3 relative to the focal plane 20 for determining the defocus.

To reduce the interference effect of such fabricated structures of the object 3 during focusing, according to the invention the object 3 is no longer positioned in the focal plane 20, but is disposed at a distance Δz (=object shift) from it in the z-direction, as illustrated in FIG. 11. Furthermore, the autofocus optic 14 is so designed according to the invention that the focusing image 19 is shifted axially by 2Δz. The focusing image 21 reflected from the sample 3 in the position of FIG. 11 will thus have its best focus (BF) location at the center of the focal plane 20. The beam path along which the focusing image is projected is therefore folded in such a way that the focusing image plane is disposed as in FIG. 4 when the object is exactly Δz away from the focal plane 20 and is therefore positioned in the target position. The defocus measurement range remains the same as in FIG. 4, and is therefore 1 μm.

This leads to the advantage that by means of the imaging optic 9, the best focus (BF) location of the reflected focusing image 21 is projected sharply into the detector plane 22, whereas structures of the object 3 itself are projected into the detector plane 22 only blurrily. This substantially reduces the influence of interfering edges and structuring of the object 3 on the measured intensity profile of the aerial image.

Figure 12:
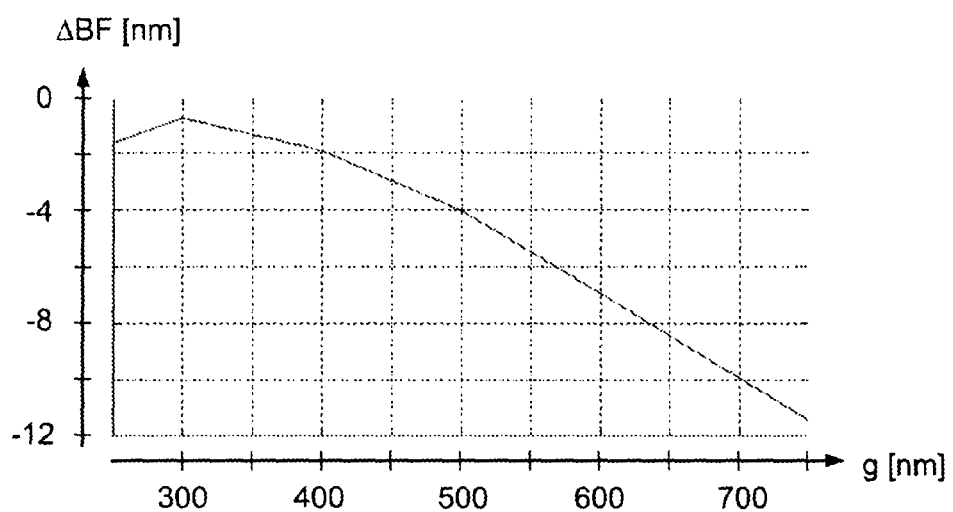
FIG. 12 is a representation of the determined defocus $\Delta BF$ as a function of the grating period g of the focusing image 19 on the object 3 for an object shift $\Delta z$ of 2 µm.

In FIG. 12, the calculated defocus ΔBF in nm is plotted on the ordinate against the grating period g of the focusing image 19 on the object 3, on the abscissa, for Δz=2 the object 3 being assumed to be shifted exactly Δz=2 μm. It can be seen that as the grating period g decreases, the calculated defocus ΔBF also decreases, thus approaching the actual defocus of 0 nm.

Figure 13:
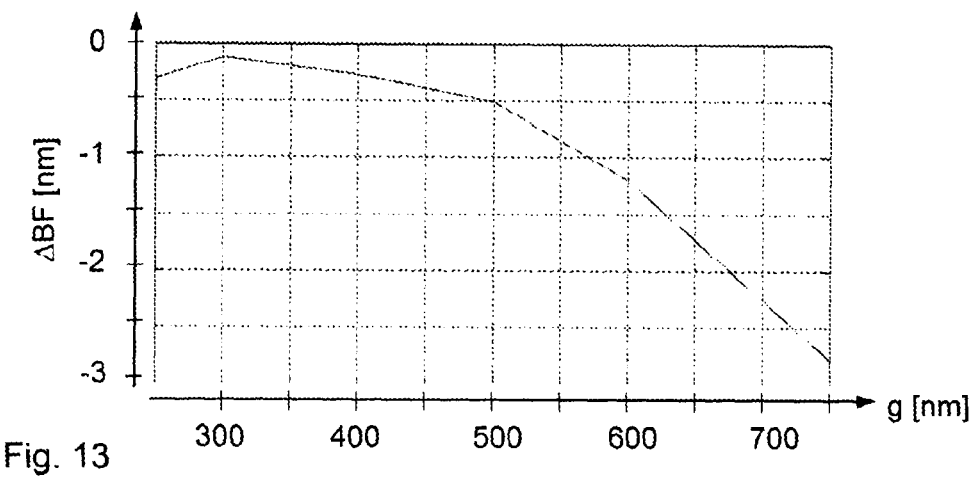
FIG. 13 is a representation of the determined defocus $\Delta BF$ as a function of the grating period g of the focusing image 19 on the object 3 for an object shift $\Delta z$ of 4 µm.

The representation of FIG. 13 is the same as that of FIG. 12, but with Δz=4 μm. FIG. 13 shows the same qualitative curve shape as FIG. 12; the calculated defocus ΔBF decreases with decreasing grating period g. However, with a grating constant of 500 nm, for example, the calculated defocus ΔBF is only −0.5 nm, compared to an object shift of Δz=2 μm, at which the calculated defocus ΔBF with a grating constant of 500 nm is approximately −4 nm.

An object shift Δz=2 μm, therefore, already yields good results. Doubling the object shift to Δz=4 μm leads to a more than proportional error reduction in the calculation of the defocus ΔBF.

Figure 10:
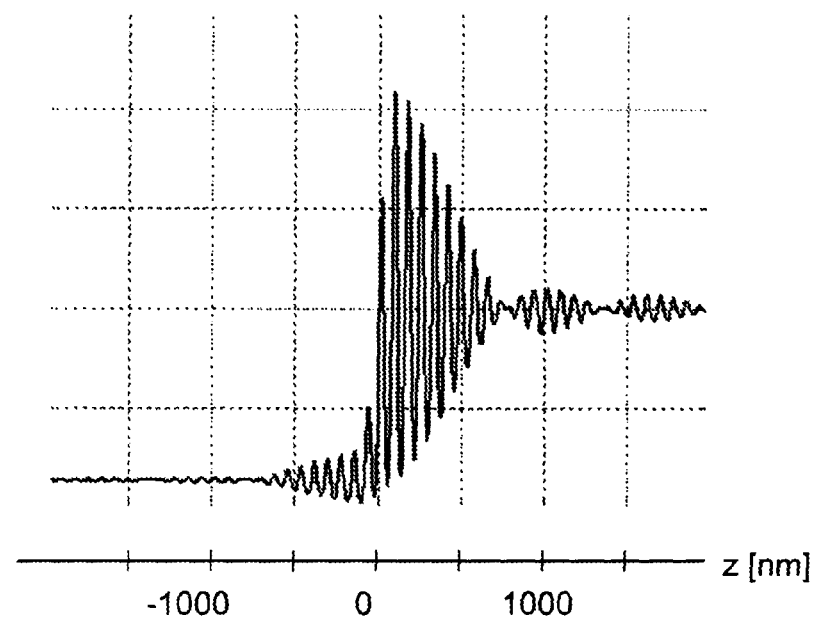
FIG. 10 is a schematic representation of the influence of a discontinuously varying reflection behavior of the object on the intensity behavior of the captured reflected focusing image.

The same reflectivity discontinuity that led to the unwanted brightness modulation and to a systematic error of 20 nm in FIG. 10 can be reduced to −4 nm by an object shift of Δz=2 μm, and to as little as −0.5 nm by an object shift of 4 μm. Thus, even in the least favorable case, where the reflectivity discontinuity occurs exactly at the best focus (BF) location, the defocus ΔBF can be determined with sufficient precision.

In FIG. 14, the calculated defocus ΔBF (ordinate) for an object shift Δz of 4 μm is plotted against the lateral position x (in μm on the abscissa) of the interfering edge (the edge between the two regions 25 and 26, and thus the location of the discontinuously varying reflectivity) on the object, for three different grating periods g. Specifically, curve K1 represents the result for g=250 nm. Curve K2 illustrates the behavior for g=500 nm, and curve K3 for g=1000 nm. Hence, at 0 on the abscissa, the interfering edge lies exactly at the best focus location BF, as described in connection with FIG. 4. Since with increasing distance x from the BF location the interfering edge moves out of the region of maximum intensity in the aerial image 23, the systematic error in the calculated defocus ΔBF becomes smaller. Since, when the interfering edge is positioned at the BF location, the systematic error in the calculated defocus ΔBF increases with increasing grating period g, the range of variation of the systematic error in the calculated defocus ΔBF also becomes greater upon lateral movement of the interfering edge.

Based on the determined defocus ΔBF and the known object shift Δz, the control unit 24 then actuates the table 11 so that the top side of the object 3 is positioned in the focal plane 20.

The desired measurement can then be performed with the microscope 2 in the state illustrated in FIG. 1.

It has been assumed in the foregoing description that the grating 11 is consistently imaged onto the object 3 in such a way that a non-transparent strip 18 lies exactly at the center of the best focus position BF in the reflected focusing image 21. This cannot be guaranteed in practice, however. For instance, the non-transparent strip 18 can easily be shifted relative to the best focus position BF. This shift will be referred to hereinafter as the grating phase or the initial phase.

Figure 15:
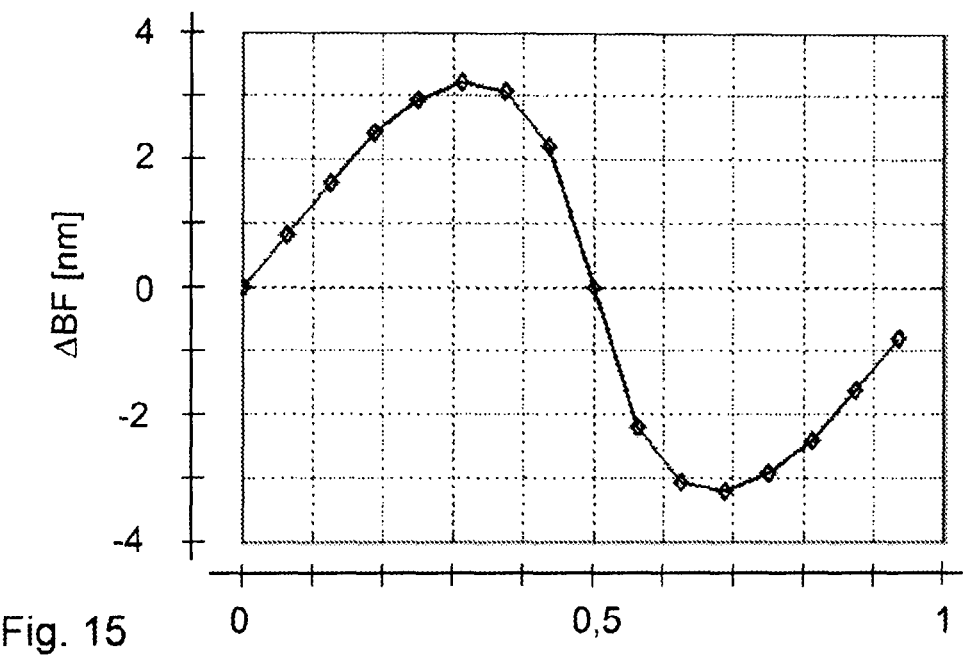
FIG. 15 is a graph illustrating the dependence of the calculated defocus $\Delta BF$ on the initial phase for a grating period g of 250 nm.

If the influence of the grating phase on the determined defocus ΔBF is simulated, the dependence illustrated in FIG. 15 materializes at a grating period g of 250 nm. In FIG. 15, the determined focus deviation ΔBF for an optimally focused object is plotted on the ordinate against the grating phase on the abscissa. As can be seen from the representation of FIG. 15, maximum apparent defocus amounts ΔBF of ±3 nm occur over a full grating phase.

The apparent defocus decreases with increasing grating period. FIG. 16 gives the same representation as FIG. 15, with a grating period of 1000 nm. Here, the maximum apparent defocus ΔBF is ±0.4 nm.

Under the conditions of both FIG. 15 and FIG. 16, the mean value over all the grating phases is approximately 0 nm, which represents the actual defocus for an optimally focused object 3. Consequently, according to a refinement of the invention aimed at improving the precision of measurement, not just one ruled grating with one period and one phase is used, but, for example, a plurality of ruled gratings having the same period but different phases.

Figure 17:
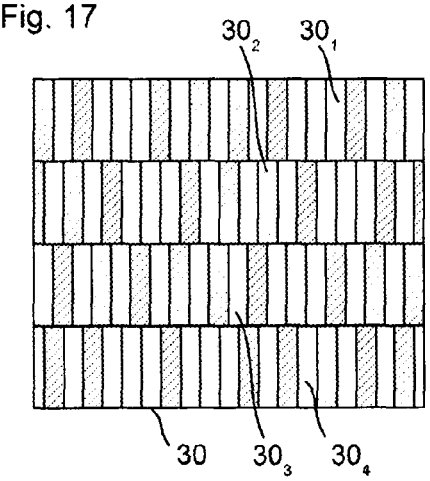
FIG. 17 shows a grating with four subgratings having the same period but different initial phases.

FIG. 17 is a representation of four ruled gratings $30_1, 30_2, 30_3, 30_4$ having the same period but different phases or initial phases and belonging to a grating 30. For each subgrating $30_1, 30_2, 30_3, 30_4$, the corresponding defocus $\Delta BF_1, \Delta BF_2, \Delta BF_3, \Delta BF_4$ is determined on the basis of the contrast, and the arithmetic mean of the defocus values $\Delta BF_1, \Delta BF_2, \Delta BF_3, \Delta BF_4$ is then calculated to arrive at a mean defocus $\Delta BF_M$.

Figure 18:
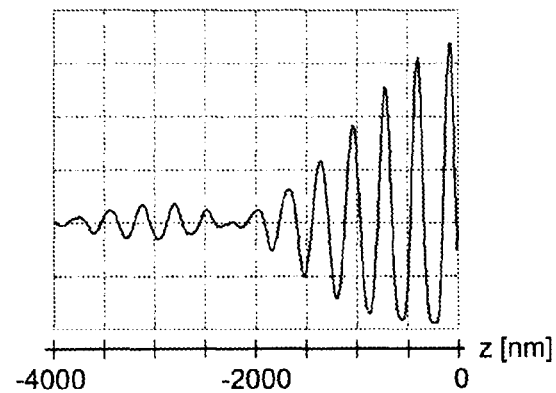
FIG. 18 shows the contrast variation for one of the subgratings from FIG. 17, assuming the best focus location to lie at the boundary of the defocus measurement range.
Figure 19:
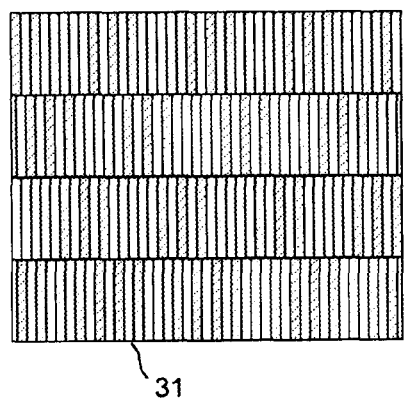
FIG. 19 shows another grating with four subgratings having the same period but different initial phases, the grating period being half that of the gratings from FIG. 17.
Figure 20:
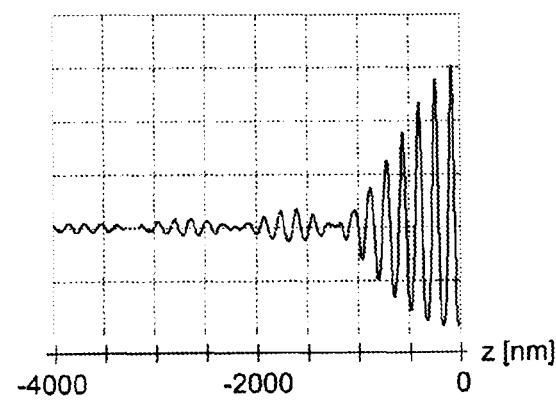
FIG. 20 shows the contrast behavior for one of the subgratings of FIG. 19, assuming the best focus location to lie at the boundary of the defocus measurement range.

FIG. 18 represents the intensity curve of one of the four subgratings $30_1$, $30_2$, $30_3$, $30_4$ from FIG. 17, assuming the best focus (BF) location to lie at the boundary of the defocus measurement range. FIGS. 19 and 20 show two other gratings 31, 32 with four mutually phase-shifted subgratings, the grating period of grating 31 in FIG. 19 being half that of grating 30 in FIG. 17. The grating period of grating 32 in FIG. 21 is, in turn, half that of grating 31 in FIG. 19.

Figure 21:
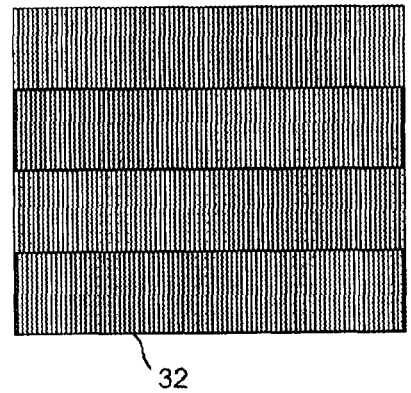
FIG. 21 shows another grating with four subgratings having the same period and different initial phases, the grating period of grating 32 of FIG. 21 being only half that of grating 31 of FIG. 19.
Figure 22:
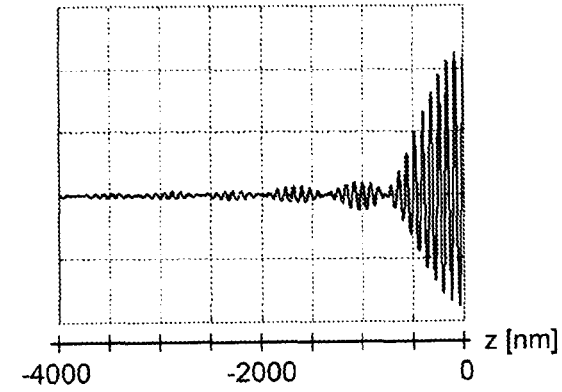
FIG. 22 shows the contrast behavior for one of the subgratings of FIG. 21, assuming the best focus location to lie at the boundary of the defocus measurement range.

The corresponding intensity curves for one of the subgratings from each of FIGS. 19 and 21 are illustrated respectively in FIGS. 20 and 22. A comparison of the representations of FIG. 18, 20 or 22 reveals that the steepness of the intensity curve increases with decreasing grating period. This can, in particular, be used to extrapolate the defocus in cases where the best focus location lies outside the capture range (=the defocus measurement range).

It has further been found that the noise of the image sensor falsifies the analysis of the aerial image contrast, which depends on lateral position. The defocus values derived from the contrast profile thus are compromised as well, giving rise to what is known as the 3σ reproducibility effect. The values of the determined defocus ΔBF will fluctuate about the mean with a standard deviation σ.

Figure 23:
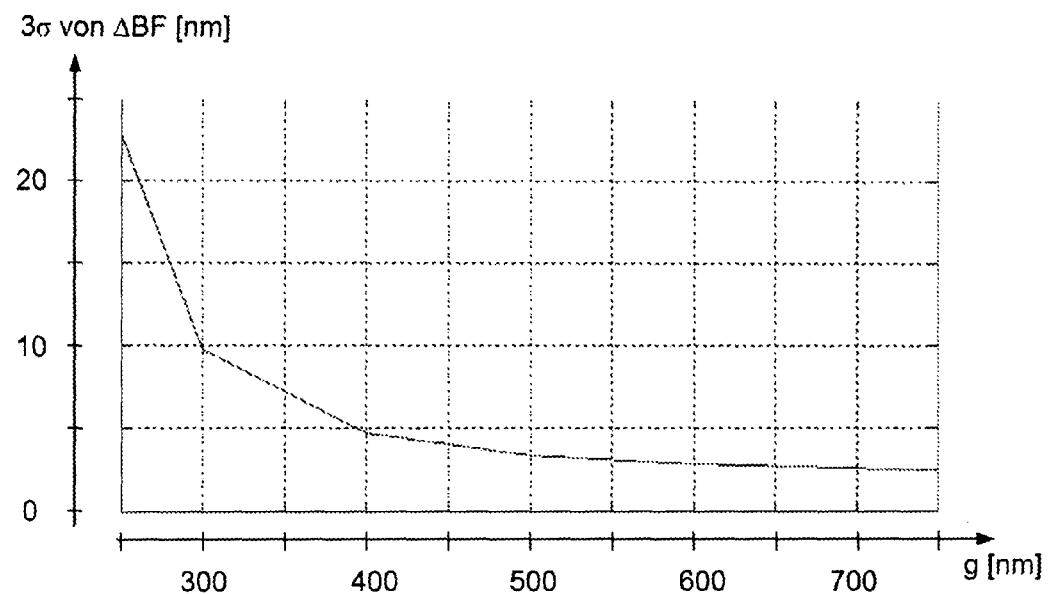
FIG. 23 is a representation of the threefold standard deviation σ of the defocus $\Delta BF$ as a function of the grating period for an assumed CCD noise level of 2%.

To simulate the influence of the CCD noise level, the specific standard deviation is determined separately for each grating phase, and the total standard deviation σ of each quadratic mean of the specific standard deviations is then calculated. With an assumed CCD noise level of 2%, the curve for grating periods g of 250-750 nm is as illustrated in FIG. 23. As the grating period increases, the influence of the CCD noise level decreases. For grating periods of less than 300 nm, however, the 3σ value increases dramatically, since with such grating periods g one approaches the limit of optical resolution ($g_{lim}=\kappa/(2\cdot NA)\approx 161$ nm) (NA=numerical aperture of the imaging objective 7 on the side facing the object 3). In this range, the grating contrast of the aerial image tends toward 0, so the CCD noise dominates.

The decrease in a with increasing g can be accounted for in particular by the fact that as g increases, so does the width of the Gaussian apodization involved in the folding, causing the noise, in effect, to be averaged over a larger lateral region perpendicular to the grating lines and thereby reduced.

To summarize, with the inventive provision of the object shift Δz, the defocus ΔBF decreases with decreasing grating constant g (which is always specified in the focusing image 19, 21). However, the suppression of CCD noise improves as the grating constant g increases. Furthermore, the phase-dependent mean calculation described in connection with FIGS. 15 and 16 leads to a smaller defocus ΔBF. In the embodiment described here, with an illumination wavelength of λ=193 nm, a numerical aperture NA for the imaging objective 7 of 0.6 and incoherent or partially coherent illumination of the grating 13, a grating period g of 300-800 nm is preferably chosen. The grating period g can in particular be in the range 400-600 nm. The object shift is preferably greater than or equal to 1 μm. It can also, however, be greater than or equal to 2 μm or greater than or equal to 4 μm. It should not be selected as greater than 10 μm, however.

The range of the grating period g can be stated in general as a function of the limit resolution $g_{lim}$, as preferably 1.5 $g_{lim}$ to 5 $g_{lim}$. g can in particular be in the range of 2.5 $g_{lim}$ to 4 $g_{lim}$. The object shift Δz can be stated in general as a function of the depth of field DOF of the imaging optic 9, where DOF=λ/$NA^2$. The object shift is preferably ≥2 DOF. It can also, however, be ≥4 DOF or ≥8 DOF, and should preferably be ≤20 DOF.

It has been assumed in the foregoing description that the detector plane 22 is perpendicular to the optical axis of the imaging optic 9 (image capture module) and the grating 13 is tilted with respect to the optical axis of the autofocus optic 14 and of the imaging objective 7, or relative to the propagation direction of the illuminating radiation. This causes the focusing plane in which the reflected focusing image 21 lies to be tilted relative to focal plane 20. In other words, the focusing plane and the focal plane are not parallel to each other. This can also be accomplished by causing the CCD detector of the CCD camera 10 to be tilted (e.g. 45°) with respect to the optical axis of the imaging optic 9 and the grating 13 to be disposed perpendicular to the propagation direction of the illuminating radiation. Naturally, both the grating 13 and the CCD detector can be tilted. It is merely necessary to ensure that the focusing plane and the focal plane are not parallel to each other.

Figure 24:
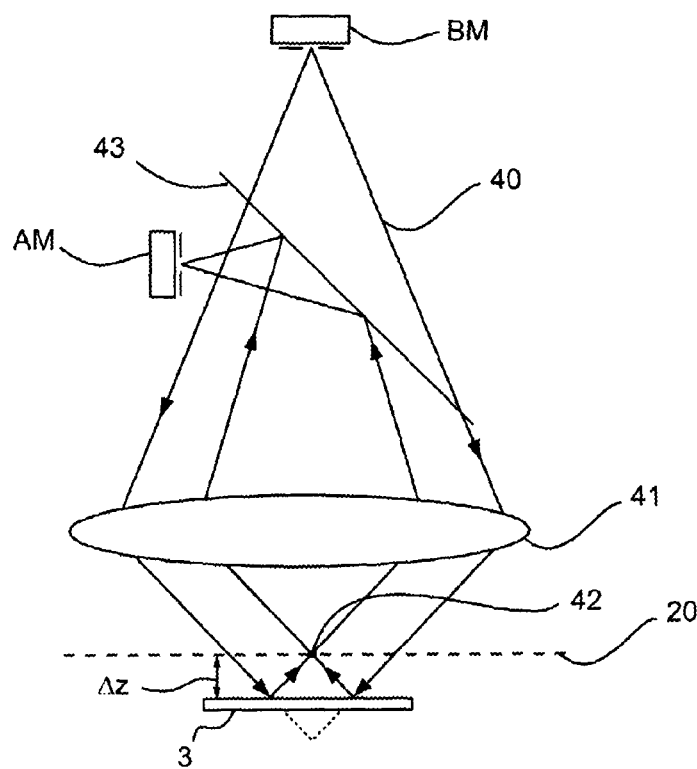
FIG. 24 is a schematic representation of a second embodiment of the autofocus device according to the invention for a confocal microscope.

FIG. 24 shows an exemplary embodiment of the autofocus device according to the invention in the vicinity of the confocal microscope. The illumination module BM illuminates the to-be-focused object 3 with illuminating radiation 40 via an autofocus optic 41 in such a way that once the illuminating radiation 40 has been reflected into focal plane 20 by the object 3, which is shifted by Δz relative to focal plane 20, the desired confocal point illumination 42 is present.

The image capture module AM is now configured in such a way that the confocal point illumination 42 is sharply imaged confocally via the partially transparent deflection mirror 43.

Since the object 3 is positioned far outside focal plane 20, the object 3 itself is not detected by the image capture module AM, thus minimizing the interfering influence of structures on the object 3.

The intensity detected by means of the image capture module can be used to determine the actual defocus ΔBF. The direction of the defocus can be deduced by performing two consecutive measurements in which the position of the object 3 is varied slightly. The direction in which the defocus ΔBF is occurring can then be inferred from these measurements. On the basis of the defocus ΔBF measured in this way, the object 3 can be positioned in the focal plane 20 by means of an object table (not shown in FIG. 24) and thereby focused for confocal imaging. The subsequent confocal examination of the object can be performed using illumination directions and deflection directions (not shown in FIG. 24) known from confocal microscopy. Where appropriate, the image capture module AM can also be used for confocal examination of the object 3. It is also, of course, possible to provide a dedicated confocal detector arm (not shown).

According to the described exemplary embodiments, a calibration can be performed. For this purpose, the defocus ΔBF determined by the autofocus device is ascertained and is compared with another focusing method. Said other focusing method can, in particular, be a focusing method in which the object is positioned in focal plane 20. The thus-calculated difference in focusing (and thus in the z-positioning of the object 3) is then used to calibrate the autofocus device according to the invention.

Figure 25:
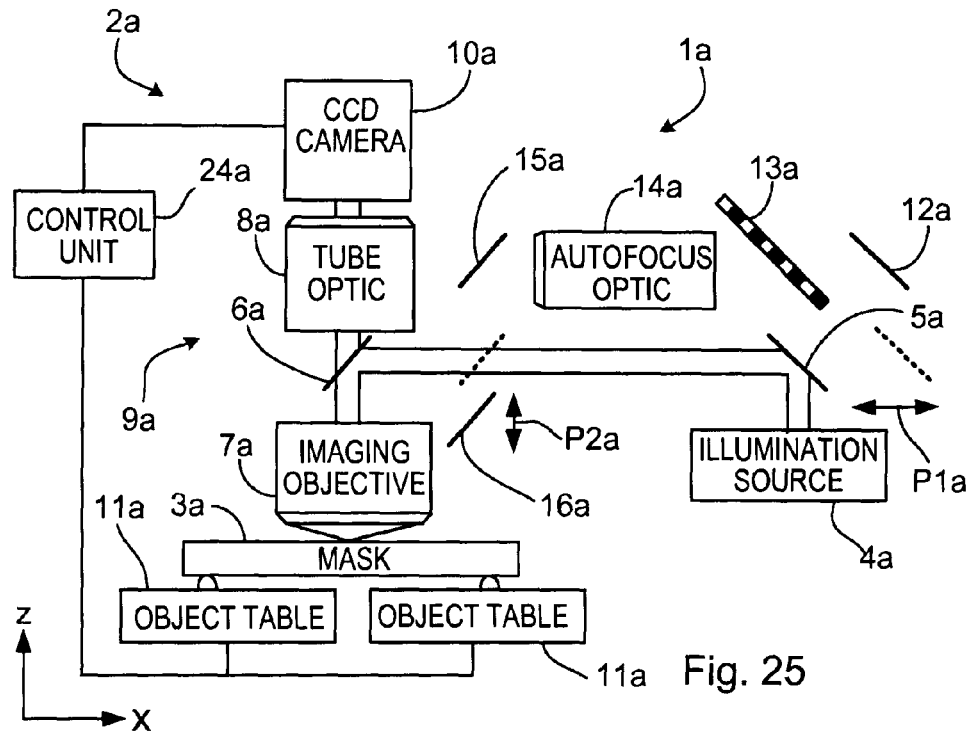
FIG. 25 shows a first embodiment of the autofocus device according to the invention.
Figure 26:
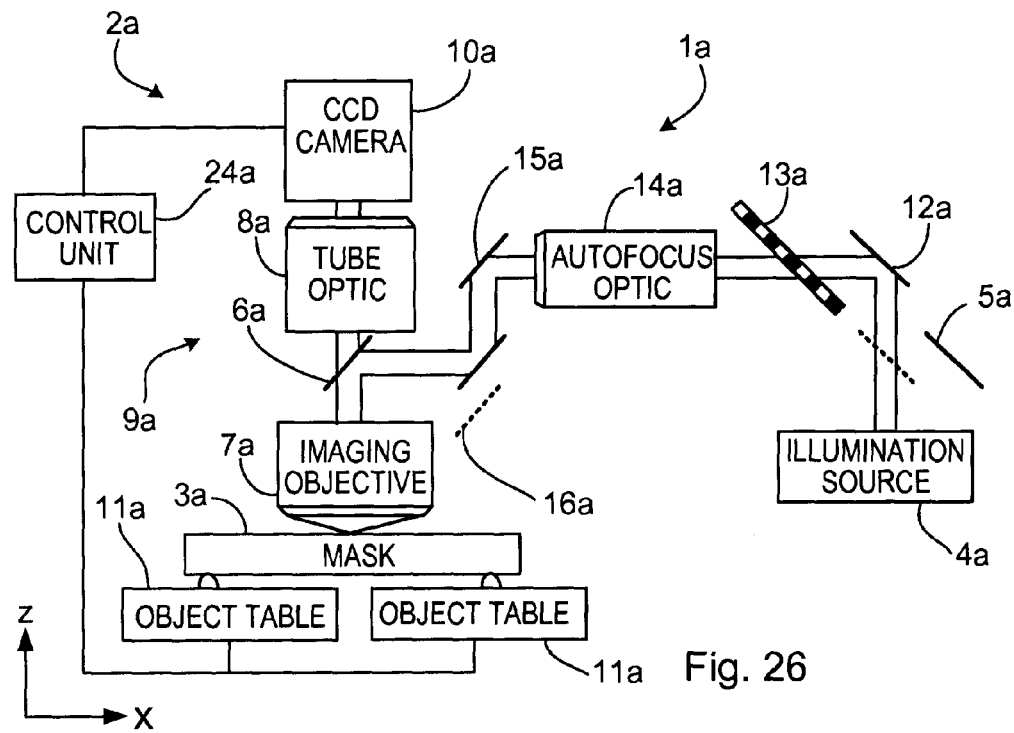
FIG. 26 is another depiction of the first embodiment of the autofocus device according to the invention.

In the embodiment illustrated in FIGS. 25 and 26, the autofocus device 1a is integrated into a microscope 2a for inspecting lithography masks 3a.

The microscope 2a includes an illumination source 4a emitting incoherent or partially coherent illuminating radiation with a wavelength of 193 nm. The illuminating radiation is guided via a first deflection mirror 5a and a second deflection mirror 6a to the imaging objective 7a and is aimed by the latter at the lithography mask (object) 3a to effect the illumination (FIG. 25).

The object 3a is projected, via the imaging objective 7a, the partially transparent deflection mirror 6a and a tube optic 8a, which together form an imaging optic 9a, to a CCD camera 10a to produce an image of a portion of the object. For example, the microscope 2a can be used for high-precision determination of the lateral positions of alignment marks on the lithography mask 3a.

The microscope 2a further comprises an object table 11a, by means of which the object 3a can be positioned both laterally and in the observation direction (i.e., the z-direction).

The autofocus device 1a uses the illumination source 4a and the imaging objective 7a of the microscope 2a to illuminate the object 3a with a focusing image, and uses the imaging objective 7a, the tube optic 8a and the CCD camera 9a to capture the focusing image.

For this purpose, on the one hand, the first deflection mirror 5a is displaceable (as indicated by double arrow P1a) in such a way that it can be moved out of the beam path of the illuminating radiation 5a coming from the illumination source 4a, as illustrated in FIG. 26. The illuminating radiation thus encounters a third deflection mirror 12a, which directs the illuminating radiation through a grating 13a that is tilted 45° with respect to the propagation direction of the illuminating radiation. The tilt angle can also, however, be any other angle within the range of 1-89°. The grating structure is projected onto the object 3a via an autofocus optic 14a, two additional deflection mirrors 15a, 16a, the second deflection mirror 6 and the imaging objective 7a. To this end, the deflection mirror 16a is provided to be translatable (double arrow P2a) such that it can be translated from the position shown in FIG. 25 to the position shown in FIG. 26, to make it possible to project the focusing image onto the object 3a.

Figure 27:
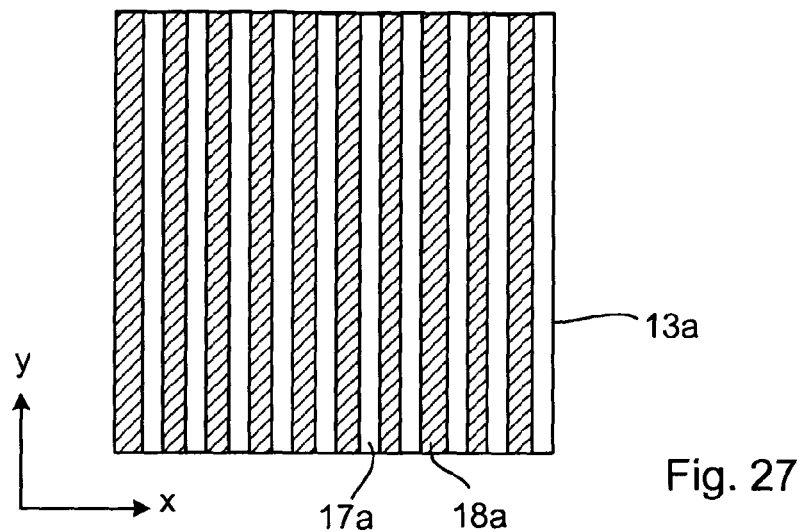
FIG. 27 is a plan view of the transmission grating 13 of FIGS. 1 and 2.

The grating 13a can, for example—as illustrated in FIG. 27—be configured as a ruled grating alternatingly comprising transparent strips 17a and non-transparent strips 18a (depicted as shaded). The grating extends periodically in the x-direction.

To explain the present invention, the principle of determining the focal position with the aid of a captured image of the grating 13a projected obliquely onto the object 3a will first be described with reference to FIGS. 28 to 33.

Figure 28:
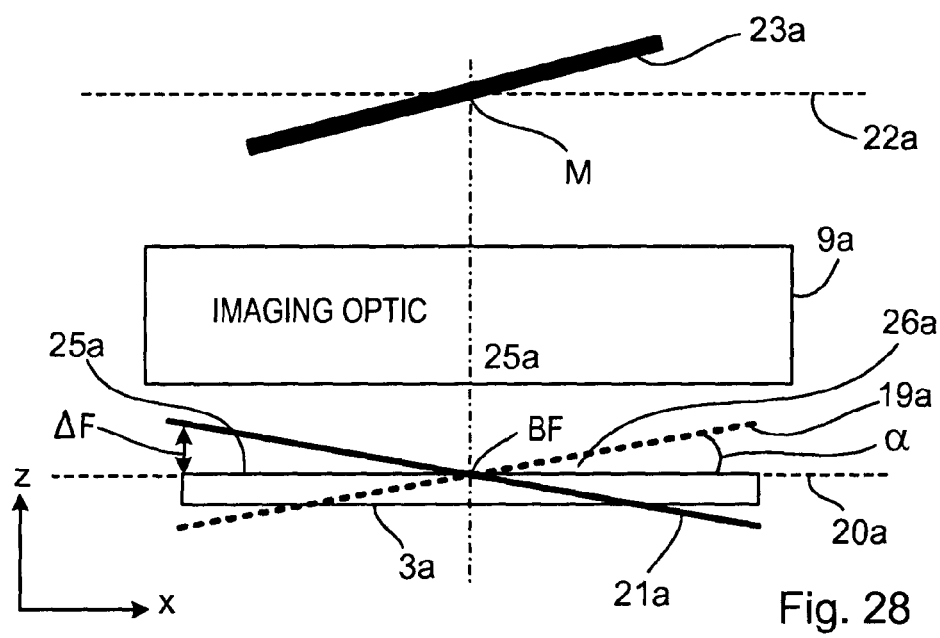
FIG. 28 is a schematic representation illustrating defocus determination based on a projected image of the tilted grating 13.
Figure 29:
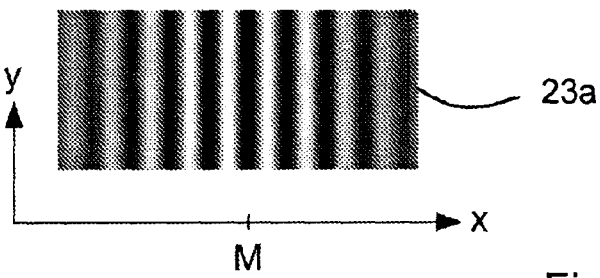
FIG. 29 is a schematic representation of the aerial image captured by the detector of the CCD camera 10.

As a result of the tilt of the grating 13a and the size-reducing imaging of the grating 13a by means of the auto focus optic 14a and the imaging objective 7a with a numerical aperture of 0.6, the angle α which the focusing image plane in which the focusing image 19a lies forms with the focal plane 20a of the imaging optic 9a of the microscope 2 is approximately 9°. In the representation of FIG. 28, it is assumed that the object 3a or its top side is positioned exactly in the focal plane 20a. The grating 13a imaged onto the object 3a, and thus the focusing image 19a, are reflected by the object 3a, as indicated by solid line 21a, and are projected as aerial image 23a by imaging optic 9a into the detector plane 22a of the two-dimensional CCD sensor (not shown) of the CCD camera 10a.

When the focus is optimal (i.e., when the object 3a is positioned in the focal plane 20a), the CCD detector sees the (aerial) image indicated in FIG. 5. Once the focusing image 19a of FIG. 28 intersects focal plane 20a at the center (viewed in the x-direction), the reflected focusing image 21a also intersects focal plane 20a at the center, as a result of which the best focus (BF) location of the reflected focusing image 21a lies at the center and the aerial image 23a of the reflected focusing image 21a at the CCD detector is sharpest at the center M and decreases outwardly in both directions. The same is true of the contrast in the aerial image 23a.

Due to the chosen tilt of the grating and the size reduction that takes place during the projection of the grating, the distance ΔF of the edge of the reflected focusing image 21a from the focal plane 20a here is 2 μm, so the capture range or defocus measurement range is ΔF/2, i.e., 1 μm.

Figure 30:
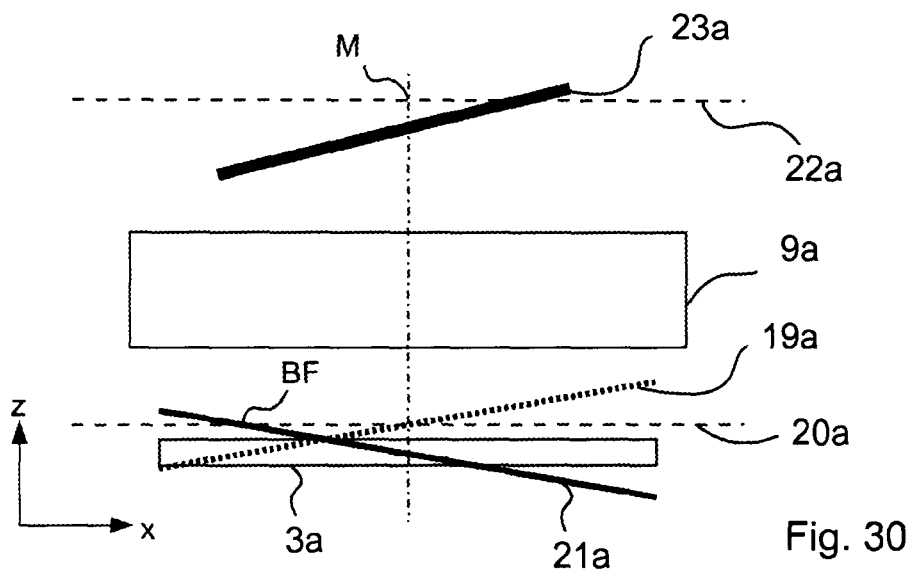
FIG. 30 is a schematic representation illustrating the shift of the reflected focusing image in the presence of a defocus of the object.
Figure 31:
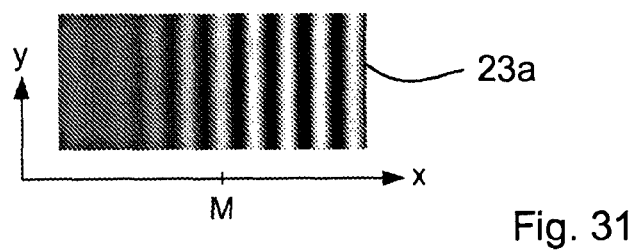
FIG. 31 is a schematic representation of the image, captured by the CCD detector of the camera 10, of the aerial image of the reflected focusing image 21 from FIG. 6.

If, for example, the object 3a is slightly defocused because it is positioned slightly below the focal plane 20a, as depicted in FIG. 30, this causes a displacement of the best focus (BF) location of the reflected aerial image 21a. The location of sharpest imaging is therefore also displaced in the aerial image 23a at the CCD detector, as indicated, for example, in FIG. 31. Defocusing of the object 3a (i.e., a deviation in the z-direction) causes a lateral displacement (in the x-direction) of the location of sharpest imaging in the aerial image 23a.

Figure 32:
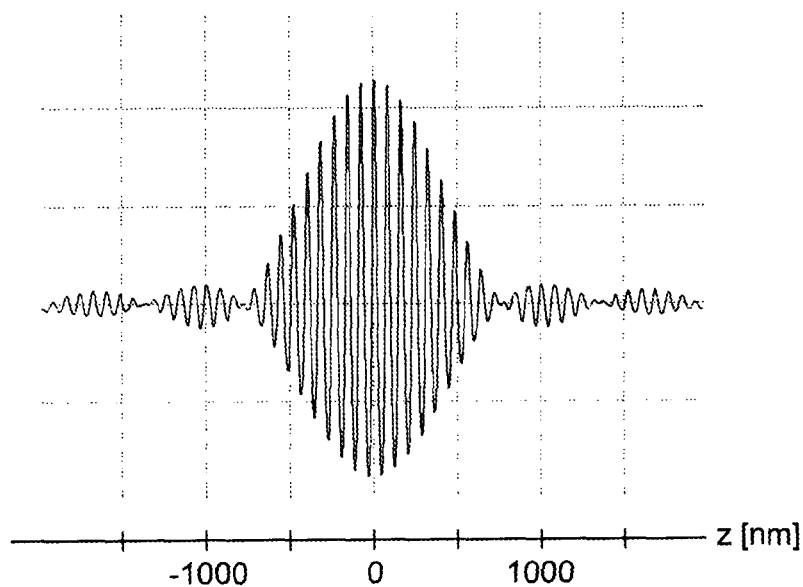
FIG. 32 is a representation of the intensity profile of the captured image from FIG. 5.

The aerial image 23a captured by the CCD camera is routed to a control unit 24a (FIGS. 25, 26) of the autofocus device 1a. The control unit 24a can, for example, calculate the mean in the y-direction (FIGS. 29, 31) for each x-value of the aerial image to derive an intensity profile that is dependent only on the x-coordinate. Once the tilt angle of the grating 13a, the size reduction factor associated with the illumination of the object 3a and the magnification factor associated with the capture of the grating image 23a are known, the determined intensity can be plotted as a function of the distance z from the focal plane 20a, as illustrated in FIG. 32. FIG. 32 is a plot of the intensity of the aerial image 23a from FIG. 29, i.e., the object 3a is optimally focused. Thus, the intensity maximum occurs at z=0 nm (best focus location), so the calculated defocus ΔBF is also equal to 0 nm. The defocus ΔBF here represents the deviation of the top side of the object 3a from the focal plane 20a in nm.

Figure 33:
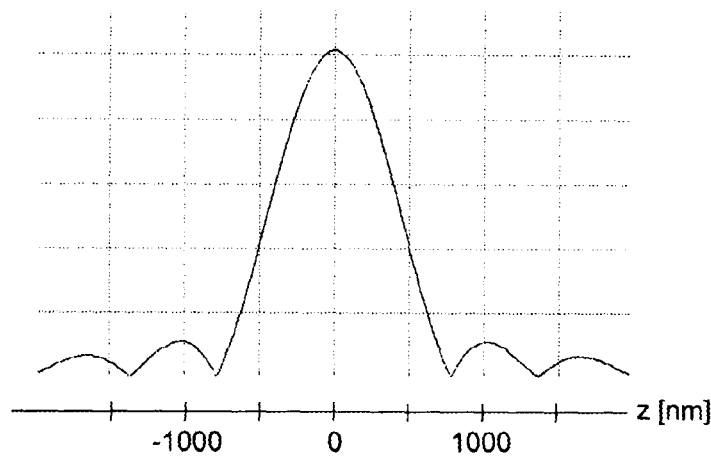
FIG. 33 is a representation of the contrast profile derived from the intensity profile of FIG. 8.

The contrast profile illustrated in FIG. 33 can be derived from the intensity profile by means of a folding operation. The position of the contrast maximum corresponds to the defocus, which is zero here, since the contrast maximum occurs at z=0 nm.

It has been assumed in the foregoing description that the grating 11a is consistently imaged onto the object 3a in such a way that a non-transparent strip 18a lies exactly at the center of the best focus position BF in the reflected focusing image 21a. This cannot be guaranteed in practice, however. For instance, the non-transparent strip 18a can easily be shifted relative to the best focus position BF. This shift will be referred to hereinafter as the grating phase or the initial phase.

Figure 34:
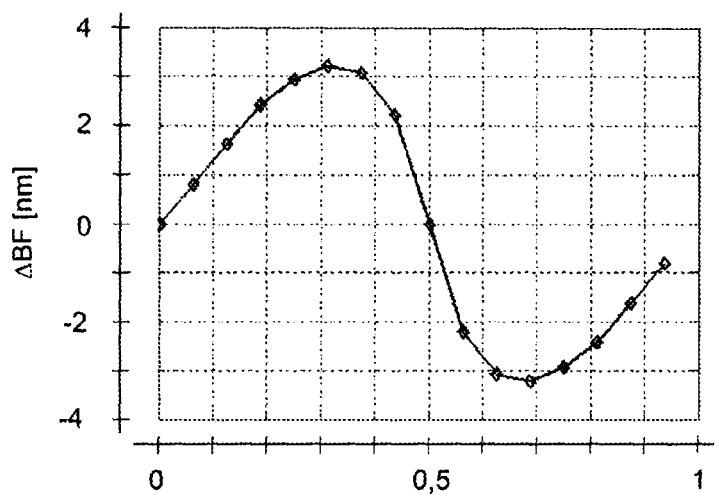
FIG. 34 is a graph illustrating the dependence of the calculated defocus $\Delta BF$ on the initial phase for a grating period g of 250 nm.

If the influence of the grating phase on the determined defocus ΔBF is simulated, the dependence illustrated in FIG. 34 materializes at a grating period g (in the focus image 19a and thus in the reflected focus image 21a) of 250 nm. In FIG. 34, the determined focus deviation ΔBF for an optimally focused object is plotted on the ordinate against the grating phase on the abscissa. As can be seen from the representation of FIG. 34, maximum apparent defocus amounts ΔBF of ±3 nm occur over a full grating phase.

Figure 38:
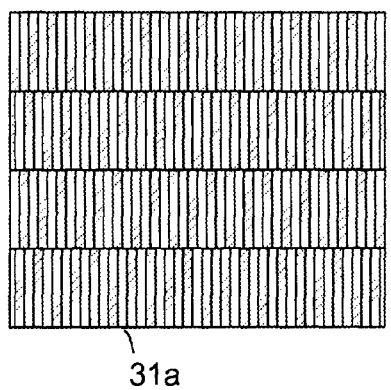
FIG. 38 shows another grating with four subgratings having the same period but different initial phases, the grating period being half that of the gratings from FIG. 12.
Figure 39:
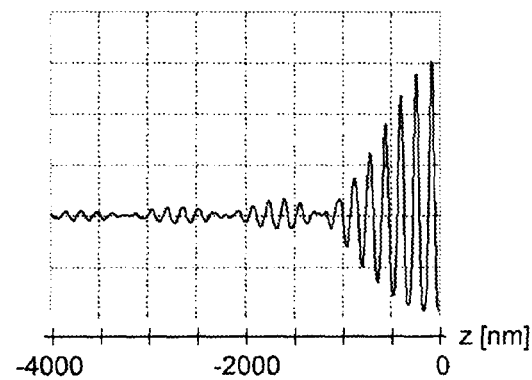
FIG. 39 shows the contrast behavior for one of the subgratings of FIG. 14, assuming the best focus location to lie at the boundary of the defocus measurement range.

The apparent defocus decreases with increasing grating period. FIG. 39 gives the same representation as FIG. 38, with a grating period of 1000 nm. Here, the maximum apparent defocus ΔBF is ±0.4 nm.

Figure 35:
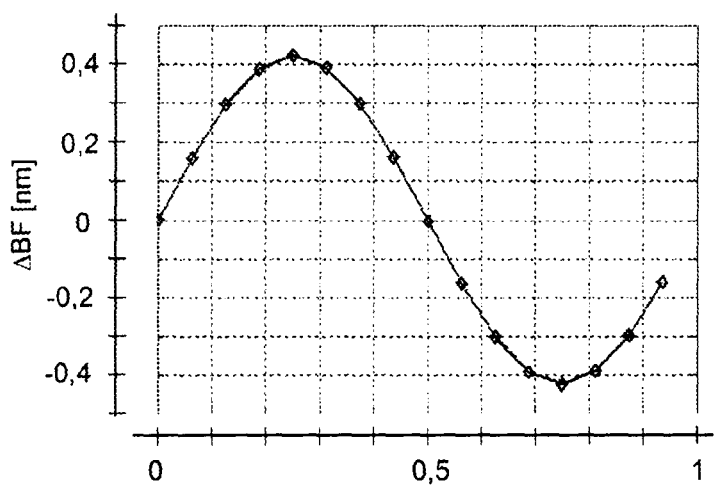
FIG. 35 is a graph illustrating the dependence of the calculated defocus $\Delta BF$ on the initial phase for a grating period g of 1000 nm.

Under the conditions of both FIG. 34 and FIG. 35, the mean value over all the grating phases is approximately 0 nm, which represents the actual defocus for an optimally focused object 3a. Consequently, according to a refinement of the invention aimed at improving the precision of measurement, not just one ruled grating with one period and one phase is used, but, for example, a plurality of ruled gratings having the same period but different phases.

Figure 36:
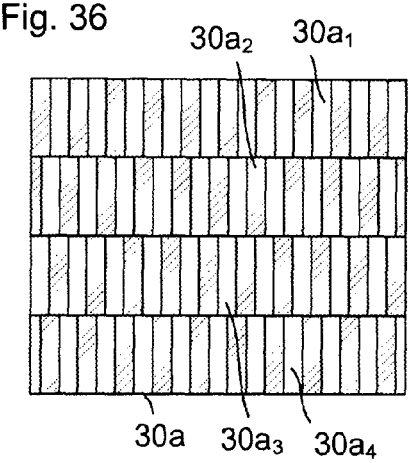
FIG. 36 shows a grating with four subgratings having the same period but different initial phases.

FIG. 36 is a representation of four ruled gratings $30a_1$, $30a_2$, $30a_3$, $30a_4$ having the same period but different phases or initial phases and belonging to a grating 30a. For each subgrating $30a_1$, $30a_2$, $30a_3$, $30a_4$, the corresponding defocus $\Delta BFa_1$, $\Delta BFa_2$, $\Delta BFa_3$, $\Delta BFa_4$ is determined on the basis of the contrast, and the arithmetic mean of the defocus values $\Delta BFa_1$, $\Delta BFa_2$, $\Delta BFa_3$, $\Delta BFa_4$ is then calculated to arrive at a mean defocus $\Delta BFa_M$.

Figure 37:
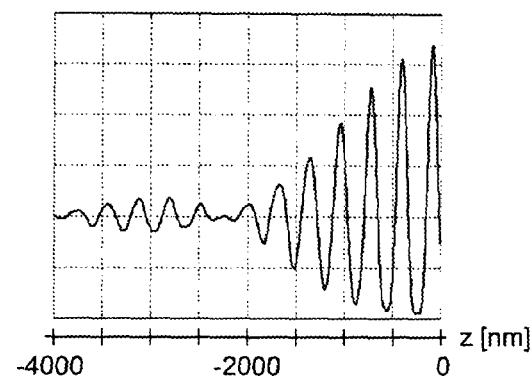
FIG. 37 shows the contrast behavior for one of the subgratings of FIG. 12, assuming the best focus location to lie at the boundary of the defocus measurement range.

FIG. 37 represents the intensity curve of one of the four subgratings $30a_1$, $30a_2$, $30a_3$, $30a_4$ from FIG. 36, the best focus (BF) location being assumed to lie at the boundary of the defocus measurement range. FIGS. 38 and 39 show two other gratings 31a, 32a with four mutually phase-shifted subgratings, the grating period of grating 31a in FIG. 38 being half that of grating 30a in FIG. 36. The grating period of grating 32a in FIG. 40 is, in turn, half that of grating 31a in FIG. 38.

The corresponding intensity curves for one of the subgratings from each of FIGS. 38 and 40 are illustrated respectively in FIGS. 39 and 41. A comparison of the representations of FIGS. 37, 39 and 41 shows that the steepness of the intensity curve increases with decreasing grating period. This can, in particular, be used to extrapolate the defocus in cases where the best focus location lies outside the capture range (=the defocus measurement range).

The gratings of FIGS. 36, 38, 40 will be designated hereinafter as multigratings. It is preferred to use a plurality of multigratings with different grating periods, which can be configured on a common substrate and thus can be imaged simultaneously as the focusing image 19a. The multigratings 30a, 31a, 32a are preferably disposed side by side perpendicularly to the grating direction, so the grating directions of the multigratings 30a, 31a, 32a are parallel to one another. In FIGS. 36, 38, 40, the grating direction extends from left to right and the multigratings 30a, 31a, 32a.

Each multigrating 30a-32a can, of course, comprise more or fewer than four subgratings. It is, however, preferred to provide at least four subgratings. The phase shift of the adjacent subgrating is preferably constant.

Based on the determined mean defocus $\Delta BFa_M$, the control unit 24a then actuates the table so that the top side of the object 3a is positioned in the focal plane 20a. The desired measurement can then be performed with the microscope 2a in the state illustrated in FIG. 25.

It has further been found that the noise of the image sensor falsifies the analysis of the aerial image contrast, which depends on lateral position. The defocus values derived from the contrast profile thus are compromised as well, giving rise to what is known as the 3σ reproducibility effect. The values of the determined defocus $\Delta BF$ will fluctuate about the mean with a standard deviation σ.

To simulate the influence of the CCD noise level, the specific standard deviation is determined separately for each grating phase, and the total standard deviation σ of each quadratic mean of the specific standard deviations is then calculated. With an assumed CCD noise level of 2%, the curve for grating periods g of 250-750 nm is as illustrated in FIG. 18. As the grating period increases, the influence of the CCD noise level decreases. For grating periods of less than 300 nm, however, the 3σ value increases dramatically, since with such grating periods g one approaches the limit of optical resolution ($g_{lim}=\lambda/(2 \cdot NA) \approx 161$ nm) (NA=numerical aperture of the imaging objective 7 on the side facing the object 3). In this range, the grating contrast of the aerial image tends toward 0, so the CCD noise dominates.

The decrease in σ with increasing g can be accounted for in particular by the fact that with increasing g, the width of the Gaussian apodization involved in the folding also increases, so that the noise is, in effect, averaged over a larger lateral region perpendicular to the grating lines and is thereby reduced.

It has further been found that fabricated structures present on the object 3a often cause unwanted intensity modulation of the captured aerial image 23a in the lateral direction (the x-direction). If, for example, a structure of the object is positioned such that the reflectivity of the left-hand region 25a (FIG. 28) is, for example, about 4% and the reflectivity of the right-hand region 26a is, for example, about 30%, the aerial image 23a will have the intensity profile illustrated in FIG. 43. The actual defocus can no longer be extrapolated from this intensity profile according to FIG. 43 with the desired precision. The systematic errors (up to 20 nm) that occur under these circumstances have been found to exceed the desired precision of measurement.

To reduce the interference effect of such fabricated structures of the object 3a during focusing, according to the invention the object 3a is no longer positioned in the focal plane 20a, but is disposed at a distance $\Delta z$ (=object shift) from it in the z-direction, as illustrated in FIG. 44. Furthermore, the autofocus optic 14a is so designed according to the invention that the focusing image 19a is shifted axially by $2\Delta z$. The focusing image 21a reflected from the sample 3a in the position of FIG. 44 will thus have its best focus (BF) location at the center of the focal plane 20a. The beam path along which the focusing image is projected is therefore folded in such a way that the focusing image plane is disposed as in FIG. 28 when the object is exactly $\Delta z$ away from the focal plane 20a and is therefore positioned in the target position. The defocus measurement range remains the same as in FIG. 28, and is therefore 4 μm.

This leads to the advantage that by means of the imaging optic 9a, the best focus (BF) location of the reflected focusing image 21a is projected sharply into the detector plane 22a, whereas structures of the object 3a itself are projected into the detector plane 22a only blurrily. This substantially reduces the influence of interfering edges and structuring of the object 3a on the measured intensity profile of the aerial image.

In FIG. 45, the calculated defocus $\Delta BF$ in nm is plotted on the ordinate against the grating period g of the focusing image 19a on the object 3a, on the abscissa, for $\Delta z=2$ μm, the object 3a being assumed to be shifted exactly $\Delta z=2$ μm. It can be seen that as the grating period g decreases, the calculated defocus $\Delta BF$ also decreases, thus approaching the actual defocus of 0 nm.

FIG. 46 provides the same representation as FIG. 45, but with $\Delta z=4$ μm. FIG. 46 shows the same qualitative curve shape as FIG. 45; the calculated defocus $\Delta BF$ decreases with decreasing grating period g. However, the calculated defocus $\Delta BF$ with a grating constant of 500 nm, for example, is only −0.5 nm, compared to an object shift of $\Delta z=2$ μm, at which the calculated defocus $\Delta BF$ with a grating constant of 500 nm is about −4 nm.

An object shift $\Delta z=2$ μm, therefore, already yields good results. Doubling the object shift to $\Delta z=4$ μm leads to a more than proportionate error reduction in the calculation of the defocus $\Delta BF$.

The same reflectivity discontinuity that led to the unwanted brightness modulation and to a systematic error of 20 nm in FIG. 43 can be reduced to −4 nm by an object shift of $\Delta z=2$ μm, and to as little as −0.5 nm by an object shift of 4 μm. Even in the least favorable case, where the reflectivity discontinuity occurs exactly at the best focus (BF) location, the defocus $\Delta BF$ can be determined with sufficient precision.

In FIG. 47, the calculated defocus $\Delta BF$ (ordinate) for an object shift $\Delta z$ of 4 μm is plotted against the lateral position x (in μm on the abscissa) of the interfering edge (the edge between the two regions 25a and 26a, and thus the location of the discontinuously varying reflectivity) on the object, for three different grating periods g. Specifically, curve K1 represents the result for g=250 nm. Curve K2 illustrates the behavior for g=500 nm, and curve K3 for g=1000 nm. Hence, at 0 on the abscissa, the interfering edge lies exactly at the best focus location BF, as described in connection with FIG. 28. Since with increasing distance x from the BF location the interfering edge moves out of the range of maximum intensity in the aerial image 23a, the systematic error in the calculated defocus ΔBF becomes smaller. Since, when the interfering edge is positioned at the BF location, the systematic error in the calculated defocus ΔBF increases with increasing grating period g, the range of variation of the systematic error in the calculated defocus ΔBF also becomes greater upon lateral movement of the interfering edge.

Based on the determined defocus ΔBF and the known object shift Δz, the control unit 24a then actuates the table 11a so that the top side of the object 3a is positioned in the focal plane 20a.

The desired measurement can then be performed with the microscope 2a in the state illustrated in FIG. 25.

To summarize, with the inventive provision of the object shift Δz, the defocus ΔBF decreases with decreasing grating constant g (which is always specified in the focusing image 19a, 21a). However, the suppression of CCD noise improves as the grating constant g increases. Furthermore, the phase-dependent mean calculation described in connection with FIGS. 34 and 11a leads to a smaller defocus ΔBF. In the embodiment described here, with an illumination wavelength of λ=193 nm, a numerical aperture NA for the imaging objective 7a of 0.6 and incoherent or partially coherent illumination of the grating 13a, a grating period g of 300-800 nm is preferably chosen. The grating period can in particular be in the range 400-600 nm. The object shift is preferably greater than or equal to 1 μm. It can also, however, be greater than or equal to 2 μm or greater than or equal to 4 μm. It should not be selected as greater than 10 μm, however.

The range of the grating period g can be stated in general as a function of the limit resolution $g_{lim}$, as preferably 1.5 $g_{lim}$ to 5 $g_{lim}$. g can in particular be in the range of 2.5 $g_{lim}$ to 4 $g_{lim}$. The object shift Δz can be stated in general as a function of the depth of field DOF of the imaging optic 9a, where DOF=Δ/NA². The object shift is preferably ≥2 DOF. It can also, however, be ≥4 DOF or ≥8 DOF, and should preferably be ≤20 DOF.

It has been assumed in the foregoing description that the detector plane 22a is perpendicular to the optical axis of the imaging optic 9a (image capture module) and the grating 13a is tilted with respect to the optical axis of the autofocus optic 14a and of the imaging objective 7a, or relative to the propagation direction of the illuminating radiation. This causes the focusing plane in which the reflected focusing image 21a lies to be tilted relative to focal plane 20a. In other words, the focusing plane and the focal plane are not parallel to each other. This can also be accomplished by causing the CCD detector of the CCD camera 10a to be tilted (e.g. 45°) with respect to the optical axis of the imaging optic 9a and the grating 13a to be disposed perpendicular to the propagation direction of the illuminating radiation. Naturally, both the grating 13a and the CCD detector can be tilted. It is merely necessary to ensure that the focusing plane and the focal plane are not parallel to each other.

According to the described exemplary embodiments, a calibration can be performed. For this purpose, the defocus ΔBF determined by the autofocus device is ascertained and is compared with another focusing method. Said other focusing method can, in particular, be a focusing method in which the object is positioned in focal plane 20a. The thus-calculated difference in focusing (and thus in the z-positioning of the object 3a) is then used to calibrate the autofocus device according to the invention.

The invention claimed is:

1. An autofocus device for an imaging device, comprising an imaging optic having a first focal plane and further comprising an object table for moving a to-be-imaged object relative to said first focal plane,
    wherein said autofocus device includes
        an image capture module having a second focal plane whose position relative to said first focal plane is known,
        an illumination module for projecting a focal plane along an illuminating beam path into a focusing image plane in such a way that when the object is positioned in a target position at a predetermined distance from said second focal plane, said illuminating beam path is folded by reflection from said object and a focusing image lying in said focusing image plane intersects said second focal plane at a predetermined position of the focusing image, and
        a control module, which, to focus said imaging device,
            actuates said object table so that said object is positioned in the target position,
            derives the deviation of the object position from the target position from a signal of said image capture module which said image capture module generates on the basis of its captured image of said focusing image when said object is positioned in the target position, and,
            based on the derived deviation, the predetermined distance and the relative positions of said first and second focal planes, actuates said object table so that said object is positioned in said first focal plane; and
    wherein said focusing image contains a plurality of subimages that are periodically intensity-modulated in a first direction and have the same period, said subimages being mutually phase-shifted.

2. The autofocus device as in claim 1, wherein said first and second focal planes coincide.

3. The autofocus device as in claim 1, wherein at least one component of said imaging optic is used as part of the image capture module.

4. The autofocus device as in claim 1, wherein said control module calculates a subimage deviation for each subimage and derives the deviation from said subimage deviations.

5. The autofocus device as in claim 1, wherein the derived deviation is compared at least once with the deviation, determined by another focusing method, of the object from the target position, and the difference thus calculated is used to calibrate said autofocus device.

6. The autofocus device of claim 1 in which the predetermined position is a center position of the focusing image.

7. The autofocus device as in claim 1, wherein said focusing image is intensity-modulated and said image capture module outputs the captured image of said focusing image as a signal.

8. The autofocus device as in claim 7, wherein said control module analyzes the captured image with respect to intensity variations or contrast variations.

9. The autofocus device as in claim 1, wherein said focusing image is periodically intensity-modulated in a first direction.

10. The autofocus device as in claim 9, wherein the first direction of said focusing image lying in said focusing image plane is not parallel to the intersection lines of said focusing image and said second focal plane.

11. An autofocusing method for an imaging device comprising an imaging optic having a first focal plane, the method comprising:
providing an image capture module that has a second focal plane whose position relative to said first focal plane is known,
positioning an object in a target position that is a predetermined distance from said second focal plane, and
projecting a focusing image along an illuminating beam path into a focusing image plane in such a way that said illuminating beam path is folded by reflection from the object positioned in the target position and said focusing image lying in said focusing image plane intersects said second focal plane at a predetermined position of the focusing image,
wherein said image capture module captures the focusing image lying in said focusing image plane, the deviation of the object position from the target position is derived from the captured image, and, based on the derived deviation, the predetermined distance and the relative positions of said first and second focal planes, the object is positioned in the first focal plane, and
wherein said focusing image contains a plurality of subimages that are periodically intensity-modulated in a first direction and have the same period, said subimages being mutually phase-shifted.

12. The method as in claim 11, wherein said first and second focal planes coincide.

13. The method as in claim 11, wherein at least one component of said imaging optic is used as part of the image capture module.

14. The method as in claim 11, wherein a subimage deviation is calculated for each subimage and the deviation is derived from said subimage deviations.

15. The method as in claim 11, wherein the derived deviation is compared at least once with the deviation, determined by another focusing method, of the object from the target position and the difference thus calculated is used to calibrate said autofocusing method.

16. The method of claim 11 in which the predetermined position is a center position of the focusing image.

17. The method as in claim 11, wherein said focusing image is intensity-modulated and said image capture module outputs the captured image of said focusing image as a signal.

18. The method as in claim 17, wherein said captured image is analyzed with respect to intensity variations or contrast variations.

19. The method as in claim 11, wherein said focusing image is periodically intensity-modulated in a first direction.

20. The method as in claim 19, wherein said first direction of said focusing image lying in said focusing image plane is not parallel to the intersection lines of said focusing image and said second focal plane.

21. An autofocus device for an imaging device, comprising an imaging optic having a first focal plane and further comprising an object table for moving a to-be-imaged object relative to said first focal plane, said autofocus device comprising:
an image capture module having a second focal plane whose position relative to said first focal plane is known,
an illumination module for projecting a focusing image containing a plurality of subimages that are periodically intensity-modulated in a first direction and have the same period, said subimages being mutually phase-shifted, along an illuminating beam path over the object into a focusing image plane in such a way that when the object is positioned in a target position, the focusing image lying in said focusing image plane intersects said second focal plane, and
a control module, which, to focus said image capture module,
actuates said object table so that said object is positioned in the target position,
derives the deviation of the object position from the target position from a signal of said image capture module which said image capture module generates on the basis of its captured image of said focusing image when said object is positioned in the target position, and,
based on the derived deviation, the target position and the relative positions of said first and second focal planes, actuates said object table so that said object is positioned in said first focal plane.

22. The autofocus device as in claim 21, wherein said first and second focal planes coincide.

23. The autofocus device as in claim 21, wherein at least one component of said imaging optic is used as part of the image capture module.

24. The autofocus device as in claim 21, wherein said image capture module outputs the captured image of said focusing image as a signal.

25. The autofocus device as in claim 21, wherein said control module analyzes the captured image with respect to intensity variations or contrast variations.

26. The autofocus device as in claim 21, wherein the first direction of said focusing image lying in said focusing image plane is not parallel to the intersection lines of said focusing image and said second focal plane.

27. The autofocus device as in claim 21, wherein said control module calculates a subimage deviation for each subimage and derives the deviation from said subimage deviations.

28. The autofocus device as in claim 21, wherein said illuminating beam path is folded by reflection from the object.

29. The autofocus device as in claim 21, wherein the target position is a predetermined distance from said second focal plane.

30. The autofocus device as in claim 21, wherein the derived deviation is compared at least once with the deviation, determined by another focusing method, of the object from the target position, and the difference thus calculated is used to calibrate said autofocus device.

31. An autofocusing method for an imaging device comprising an imaging optic having a first focal plane, the method comprising:
providing an image capture module that has a second focal plane whose position relative to said first focal plane is known,
positioning the object in a target position,
projecting a focusing image containing a plurality of subimages that are periodically intensity-modulated in a first direction and have the same period, said subimages being mutually phase-shifted, along an illuminating beam path past said object into a focusing image plane in such a way that said focusing image, lying in said focusing image plane, intersects said second focal plane,
wherein said image capture module captures said focusing image lying in said focusing image plane, the deviation of the object position from the target position is derived from said captured image, and, based on the derived deviation, the target position and the relative positions of said first and second focal planes, said object is positioned in said first focal plane.

32. The method as in claim 31, wherein said first and second focal planes coincide.

33. The method as in claim 31, wherein at least one component of said imaging optic is used as part of the image capture module.

34. The method as in claim 31, wherein said image capture module outputs the captured image of said focusing image as a signal.

35. The method as in claim 31, wherein said captured image is analyzed with respect to intensity variations or contrast variations.

36. The method as in claim 31, wherein the first direction of said focusing image lying in said focusing image plane is not parallel to the intersection lines of said focusing image and second focal plane.

37. The method as in claim 31, wherein a subimage deviation is calculated for each subimage and the deviation is derived from said subimage deviations.

38. The method as in claim 31, wherein the derived deviation is compared at least once with the deviation, determined by another focusing method, of the object from the target position, and the difference thus calculated is used to calibrate said autofocus device.

39. The method as in claim 31, wherein said illuminating beam path is folded by reflection from the object.

40. The method as in claim 39, wherein said target position is a predetermined distance from said second focal plane.

41. An autofocus device for an imaging device, comprising:
    an imaging optic having a first focal plane;
    an object table configured to move an object relative to the first focal plane;
    wherein the autofocus device comprises:
        an image capture module having a second focal plane whose position relative to the first focal plane is known,
        an illumination module for projecting a focal plane along an illuminating beam path into a focusing image plane in such a way that when the object is positioned in a target position at a predetermined distance from the second focal plane, the illuminating beam path is folded by reflection from the object and a focusing image lying in the focusing image plane intersects the second focal plane or lies in the second focal plane, and
        a control module that is configured to focus the imaging device by
            actuating the object table so that the object is positioned at or near the target position to cause at least a portion of the focusing image to be projected into a detector plane of the image capture module sharply, and to cause structures of the object to be projected into the detector plane blurrily, in which the predetermined distance between the target position and the second focal plane is configured such that an influence of structures of the object on the focusing image is less than a predetermined amount,
            deriving a deviation, if any, of the object position from the target position from a signal of the image capture module that is generated based on a captured image of the focusing image when the object is positioned at or near the target position, and
            based on the derived deviation, the predetermined distance, and the relative positions of the first and second focal planes, actuating the object table so that the object is positioned in the first focal plane; and
        wherein the focusing image contains a plurality of subimages that are periodically intensity-modulated in a first direction and have the same period, the subimages being mutually phase-shifted.

42. The autofocus device as in claim 41 in which the first and second focal planes coincide.

43. The autofocus device as in claim 41 in which at least one component of the imaging optic is used as part of the image capture module.

44. The autofocus device as in claim 41 in which the control module calculates a subimage deviation for each subimage and derives the deviation from the subimage deviations.

45. The autofocus device as in claim 41 in which the derived deviation is compared at least once with the deviation, determined by another focusing method, of the object from the target position, and the difference thus calculated is used to calibrate the autofocus device.

46. The autofocus device as in claim 41 in which the focusing image is intensity-modulated and the image capture module outputs the captured image of the focusing image as a signal.

47. The autofocus device as in claim 46 in which the control module analyzes the captured image with respect to intensity variations or contrast variations.

48. The autofocus device as in claim 41 in which the focusing image is periodically intensity-modulated in a first direction.

49. The autofocus device as in claim 48 in which the first direction of the focusing image lying in the focusing image plane is not parallel to the intersection lines of the focusing image and the second focal plane.

50. An autofocusing method for an imaging device comprising an imaging optic having a first focal plane, the method comprising:
    providing an image capture module that has a second focal plane whose position relative to the first focal plane is known;
    positioning the object in a target position that is a predetermined distance from the second focal plane;
    projecting a focusing image along an illuminating beam path into a focusing image plane in such a way that the illuminating beam path is folded by reflection from the object positioned in the target position and the focusing image lying in the focusing image plane intersects the second focal plane or lies in the second focal plane;
    capturing, using the image capture module, the focusing image lying in the focusing image plane;
    deriving a deviation of the object position from the target position from the captured image; and
    based on the derived deviation, the predetermined distance, and the relative positions of the first and second focal planes, positioning the object in the first focal plane;
    wherein when the object is positioned at or near the target position, at least a portion of the focusing image is projected into a detector plane of the image capture module sharply, and structures of the object are projected into the detector plane blurrily, and the predetermined distance between the target position and the second focal plane is configured such that an influence of structures of the object on the focusing image is less than a predetermined amount; and wherein the focusing image contains a plurality of subimages that are periodically intensity-modulated in a first direction and have the same period, the subimages being mutually phase-shifted.

51. The method as in claim 50 in which the first and second focal planes coincide.

52. The method as in claim 50 in which at least one component of the imaging optic is used as part of the image capture module.

53. The method as in claim 50 in which a subimage deviation is calculated for each subimage and the deviation is derived from the subimage deviations.

54. The method as in claim 50 in which the derived deviation is compared at least once with the deviation, determined by another focusing method, of the object from the target position and the difference thus calculated is used to calibrate the autofocusing method.

55. The method as in claim 50 in which the focusing image is intensity-modulated and the image capture module outputs the captured image of the focusing image as a signal.

56. The method as in claim 55 in which the captured image is analyzed with respect to intensity variations or contrast variations.

57. The method as in claim 50 in which the focusing image is periodically intensity-modulated in a first direction.

58. The method as in claim 57 in which the first direction of the focusing image lying in the focusing image plane is not parallel to the intersection lines of the focusing image and the second focal plane.

59. An autofocus device for an imaging device, comprising an imaging optic having a first focal plane and further comprising an object table for moving a to-be-imaged object relative to the first focal plane,
wherein the autofocus device includes
an image capture module having a second focal plane whose position relative to the first focal plane is known,
an illumination module for projecting a focal plane along an illuminating beam path into a focusing image plane in such a way that a focus image on the focusing image plane and the second focal plane are located at opposite sides of a target plane at a predetermined distance from the second focal plane, and when a surface of the object is positioned in the target plane, the illuminating beam path is folded by reflection from the surface of the object and a reflected focus image lying in the reflected focusing image plane intersects the second focal plane, and
a control module, which, to focus the imaging device,
actuates the object table so that the object is positioned in the target position,
derives the deviation of the object position from the target position from a signal of the image capture module which the image capture module generates on the basis of its captured image of the focusing image when the object is positioned in the target position, and,
based on the derived deviation, the predetermined distance and the relative positions of the first and second focal planes, actuates the object table so that the object is positioned in the first focal plane; and
wherein the focusing image contains a plurality of subimages that are periodically intensity-modulated in a first direction and have the same period, the subimages being mutually phase-shifted.

60. The autofocus device of claim 59 in which the first and second focal planes coincide.

61. The autofocus device of claim 59 in which at least one component of the imaging optic is used as part of the image capture module.

62. The autofocus device of claim 59 in which the control module calculates a subimage deviation for each subimage and derives the deviation from the subimage deviations.

63. The autofocus device of claim 59 in which the derived deviation is compared at least once with the deviation, determined by another focusing method, of the object from the target position, and the difference thus calculated is used to calibrate the autofocus device.

64. The autofocus device of claim 59 in which the focusing image is intensity-modulated and the image capture module outputs the captured image of the focusing image as a signal.

65. The autofocus device of claim 64 in which the control module analyzes the captured image with respect to intensity variations or contrast variations.

66. The autofocus device of claim 59 in which the focusing image is periodically intensity-modulated in a first direction.

67. The autofocus device of claim 66 in which the first direction of the focusing image lying in the focusing image plane is not parallel to the intersection lines of the focusing image and the second focal plane.

68. An autofocusing method for an imaging device comprising an imaging optic having a first focal plane, the method comprising:
providing an image capture module that has a second focal plane whose position relative to the first focal plane is known,
positioning an object in a target position that is a predetermined distance from the second focal plane, and
projecting a focusing image along an illuminating beam path into a focusing image plane in such a way that without the object, the focusing image and the second focal plane are located at opposite sides of a target position at a predetermined distance from the second focal plane, and when the object is positioned at the target position, the illuminating beam path is folded by reflection from the object and the reflected focusing image lying in the reflected focusing image plane intersects the second focal plane,
wherein the image capture module captures the focusing image lying in the focusing image plane, the deviation of the object position from the target position is derived from the captured image, and, based on the derived deviation, the predetermined distance and the relative positions of the first and second focal planes, the object is positioned in the first focal plane; and
wherein the focusing image contains a plurality of subimages that are periodically intensity-modulated in a first direction and have the same period, the subimages being mutually phase-shifted.

69. The method of claim 68 in which the first and second focal planes coincide.

70. The method of claim 68 in which at least one component of the imaging optic is used as part of the image capture module.

71. The method of claim 68 in which a subimage deviation is calculated for each subimage and the deviation is derived from the subimage deviations.

72. The method of claim 68 in which the derived deviation is compared at least once with the deviation, determined by another focusing method, of the object from the target position and the difference thus calculated is used to calibrate the autofocusing method.

73. The method of claim 68 in which the focusing image is intensity-modulated and the image capture module outputs the captured image of the focusing image as a signal.

74. The method of claim 73 in which the captured image is analyzed with respect to intensity variations or contrast variations.

75. The method of claim 68 in which the focusing image is periodically intensity-modulated in a first direction.

76. The method of claim 75 in which the first direction of the focusing image lying in the focusing image plane is not parallel to the intersection lines of the focusing image and the second focal plane.

* * * * *

UNITED STATES PATENT AND TRADEMARK OFFICE
CERTIFICATE OF CORRECTION

PATENT NO. : 9,229,209 B2
APPLICATION NO. : 12/863824
DATED : January 5, 2016
INVENTOR(S) : Michael Arnz et al.

It is certified that error appears in the above-identified patent and that said Letters Patent is hereby corrected as shown below:

Specification

Column 11

Line 35, delete "($g_{lim} = \kappa /(2 \cdot NA) \approx 161$ nm)" and insert -- ($g_{lim} = \lambda /(2 \cdot NA) \approx 161$ nm) --

Column 17

Lines 44-45, delete "DOF = $\Delta/NA^2$" and insert -- DOF = $\lambda/NA^2$ --

Signed and Sealed this
Nineteenth Day of April, 2016

Michelle K. Lee
*Director of the United States Patent and Trademark Office*